United States Patent [19]

Sugiura

[11] Patent Number: 4,490,035
[45] Date of Patent: Dec. 25, 1984

[54] ABNORMALITY DETECTING DEVICE FOR THE ORIGINAL CARRIAGE OF A COPYING MACHINE

[75] Inventor: Masamichi Sugiura, Toyokawa, Japan

[73] Assignee: Minolta Camera Kabushiki Kaisha, Osaka, Japan

[21] Appl. No.: 409,136

[22] Filed: Aug. 18, 1982

[30] Foreign Application Priority Data

Aug. 20, 1981 [JP] Japan ................................. 56-131202

[51] Int. Cl.$^3$ .......................................... G03G 15/00
[52] U.S. Cl. ..................................... 355/8; 355/14 C
[58] Field of Search .......... 355/8, 14 R, 14 C, 14 CU; 371/20, 62

[56] References Cited

U.S. PATENT DOCUMENTS

| 3,813,157 | 5/1974 | Fantozzi | 355/14 CU |
| 3,928,772 | 12/1975 | Mooney | 355/14 R X |
| 4,023,109 | 5/1977 | Shreve | 371/62 |
| 4,211,482 | 7/1980 | Arai et al. | |
| 4,269,500 | 5/1981 | Ito et al. | |
| 4,305,653 | 12/1981 | Evanitsky | 355/8 |
| 4,366,219 | 12/1982 | Beery | 355/8 X |

FOREIGN PATENT DOCUMENTS 54-4131  1/1979  Japan ................................. 355/14 R Primary Examiner—John F. Gonzales
Assistant Examiner—J. Pendegrass
Attorney, Agent, or Firm—Jackson, Jones & Price

[57] ABSTRACT

An abnormality detecting device for a copying machine of a type having a scanner for scanning an original to be copied comprises a timer or counter for counting the time required for the scanner to move from a start position to a scanned position. The count value of the timer or counter is subtracted as the scanner moves from the scanned position back towards the start position. The count value and the result of the subtraction is compared to find the presence or absence of any abnormal condition occurring in the return movement of the scanner from the scanned position towards the start position.

10 Claims, 34 Drawing Figures

Fig. 10(a)
Fig. 10
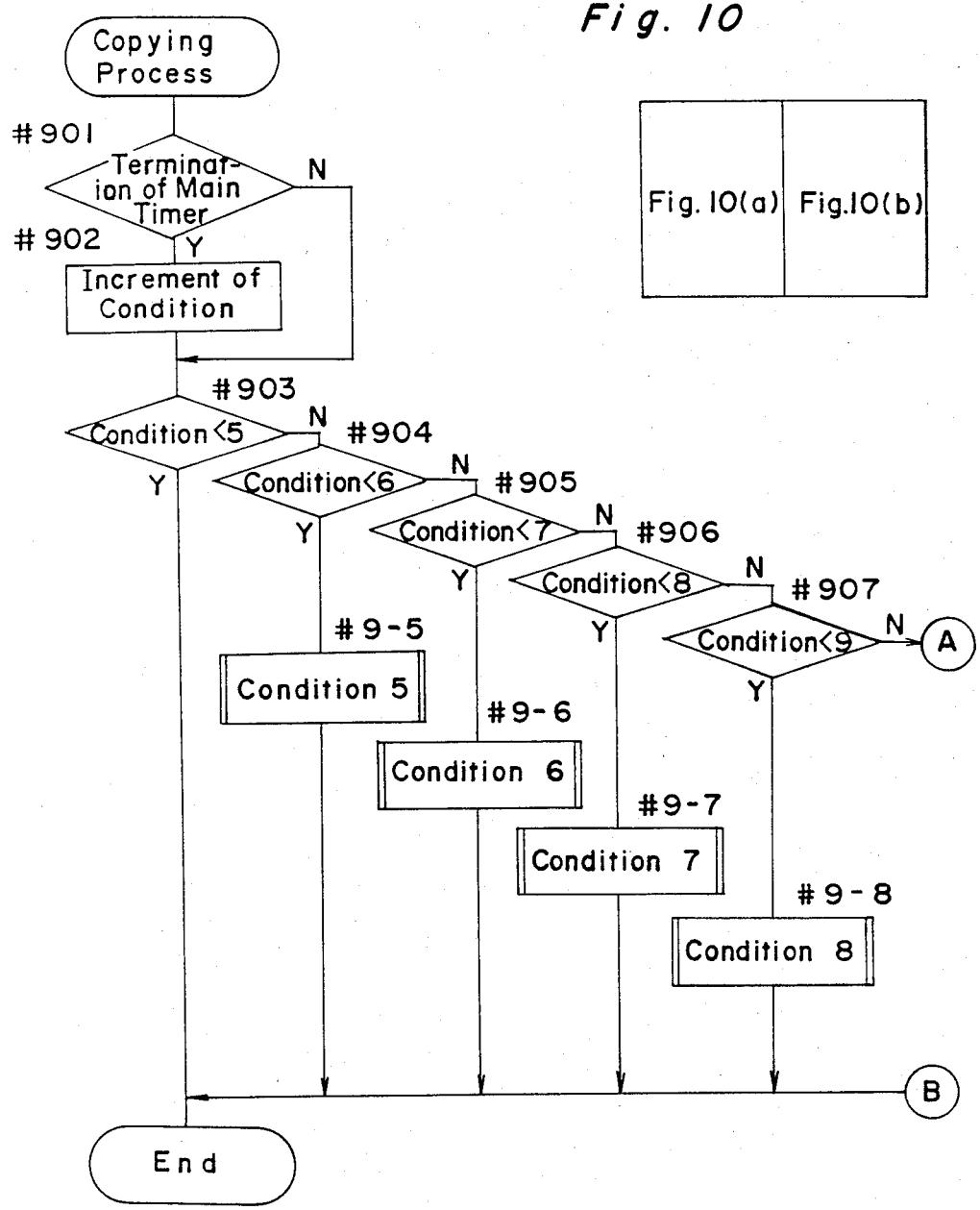
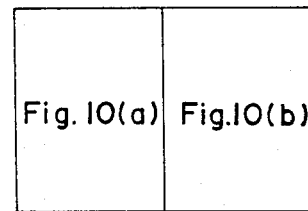

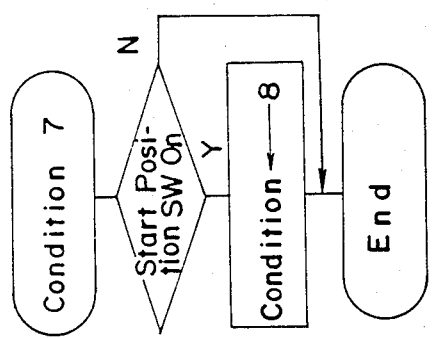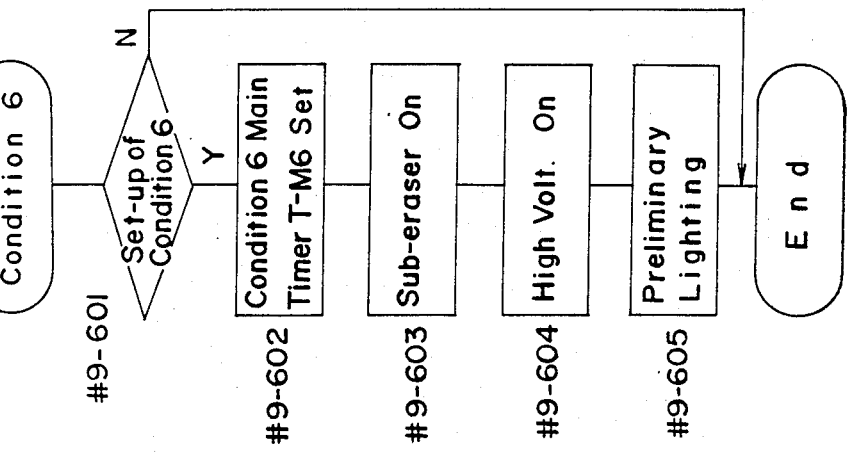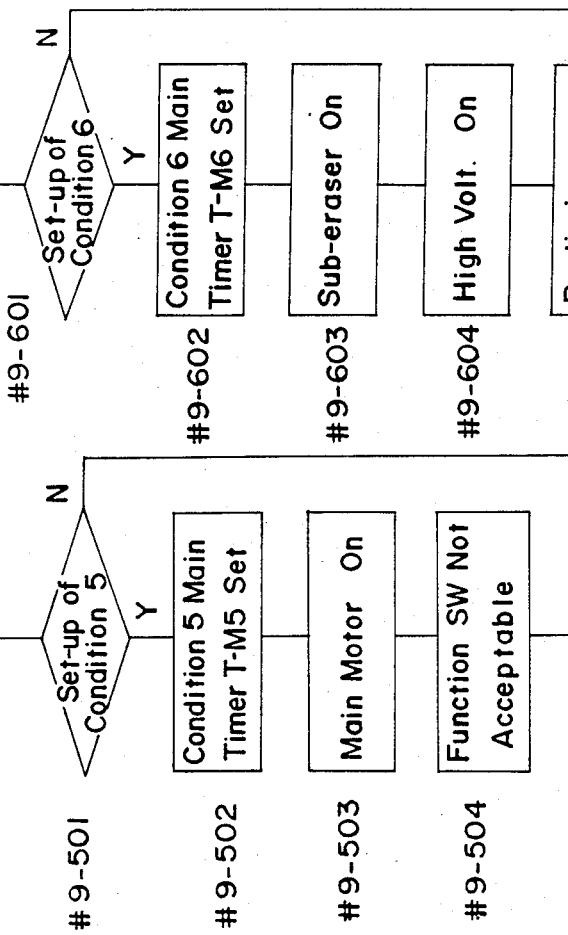

| Fig. 15(a) | Fig 15(b) |

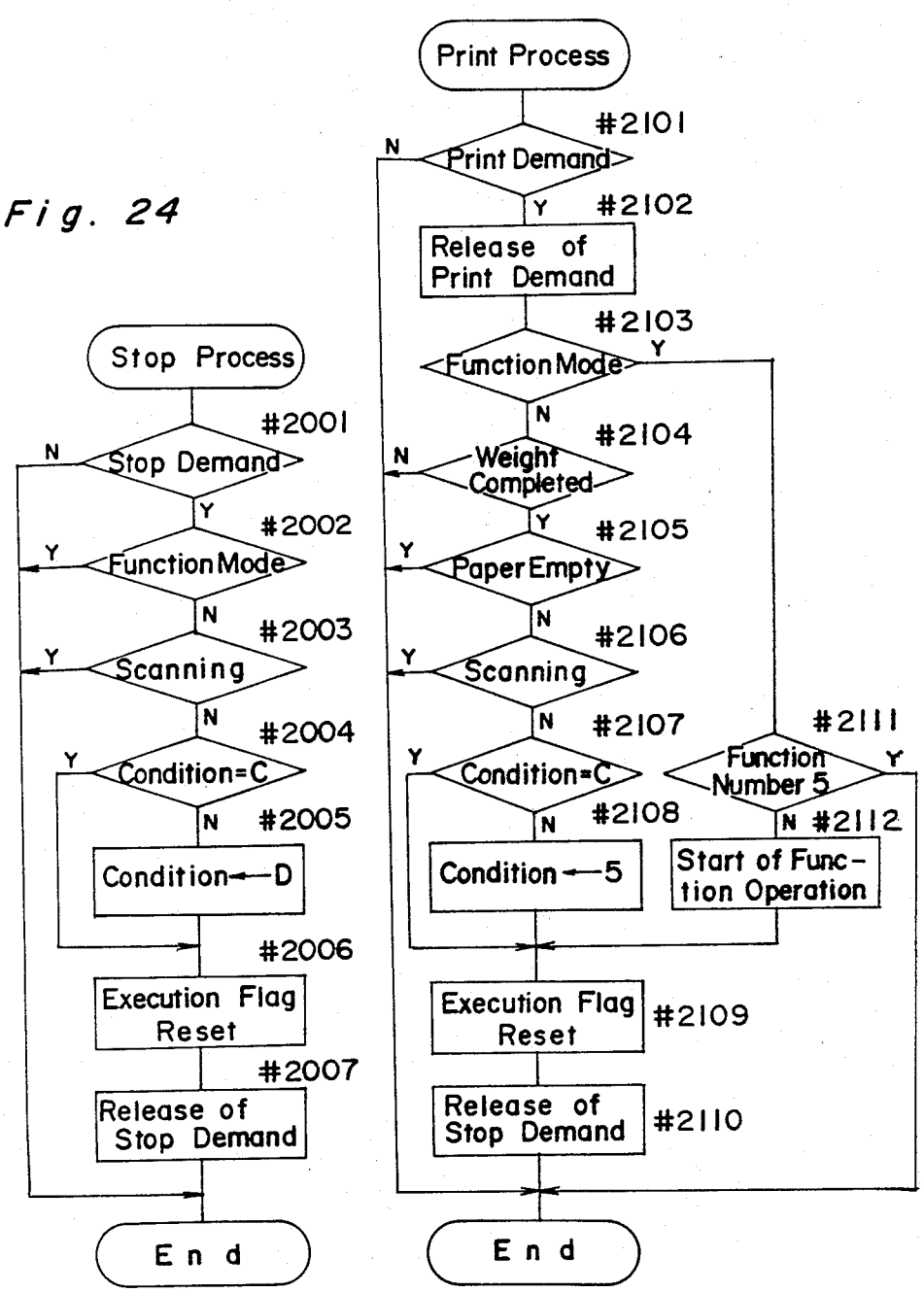

ABNORMALITY DETECTING DEVICE FOR THE ORIGINAL CARRIAGE OF A COPYING MACHINE

BACKGROUND OF THE INVENTION

The present invention generally relates to an abnormality detecting system for a copying machine and, more particularly, to an abnormality detecting device for detecting a failure occurring in the scanning movement of the copying machine.

In a copying machine of a scanning type, the distance over which the scanning movement is effected is controlled in dependence on the length of the original or the copying paper in order to increase the copying efficiency. This control of the scanning movement is available in two systems, i.e., a so-called step-return system and a so-called random return system. In the step-return system, a plurality of predetermined return positions are provided so that one of them can be selected according to the size of the original and/or the copying paper. On the other hand, in the random return system, the return position can be variable according to the length of the original and/or the copying paper.

With a diversity of control systems recently available for copying machines, trouble shooting associated with the copying operation must be carried out in every detail and this is true of the abnormality detection of a scan moving means. However, in the above described random return system, since the return position varies at random, and since it is therefore impossible to predetermine a timer for defining the timing at which any abnormality should be detected, the detection of the abnormality which would occur during the return movement cannot be achieved accurately.

SUMMARY OF THE INVENTION

The present invention has been developed with a view to substantially eliminating these disadvantages and inconveniences inherent in the prior art detecting devices and has for its essential object to provide an improved abnormality detecting system for a copying machine of a random return type wherein the occurrence of an abnormal condition during the return of the scanning means can be detected by activating a timer incident to the scanning movement, counting the time required to complete the scanning and utilizing the count value, obtained during the scanning movement, to find the occurrence of the abnormal condition.

In one preferred embodiment of the present invention, the timer is operated during the activation of a solenoid which is turned on to effect the scanning movement of an original support of the copying machine, so that it can count the time during which the original support undergoes its scanning movement, the count value being then stored. Subsequently and simultaneously with the start of the return of the original support, the stored time is subtracted by the measured return time and, in view of the fact that the return speed is higher than the scanning speed, an abnormal condition is deemed as not occurring if the original support returns to the start position before the result of the subtraction process becomes "0" and as occurring if the result of the subtraction process becomes "0". Thus, as a result of an initial calibration to the scan time for a particular paper length and the storage of that time period, it is possible to compute an abnormality by measuring the normally faster return time and comparing it with the stored scan time.

Alternatively, the timer or counter for counting the time during which the original support moves in the scanning direction may be provided separately of a timer or counter for counting the return time so that, unless the difference between these times attains "0" or a predetermined value, the abnormal condition can also be determined as occurring.

BRIEF DESCRIPTION OF THE DRAWINGS

These and other objects and features of the present invention will become apparent from the following detailed description taken in conjunction with a preferred embodiment thereof with reference to the accompanying drawings, in which:

FIGS. 11 to 20 are flow charts showing the conditions 5, 6, 7, 8, 9, A, C, D, E and F shown in FIG. 10, respectively;

FIG. 24 is a flow chart showing the details of the control during the stop processing at the step #20;

FIG. 25 is a flow chart showing the details of the control during the print processing at the step #21 showing in FIG. 6;

DESCRIPTION OF THE PREFERRED EMBODIMENT

Figure 1:
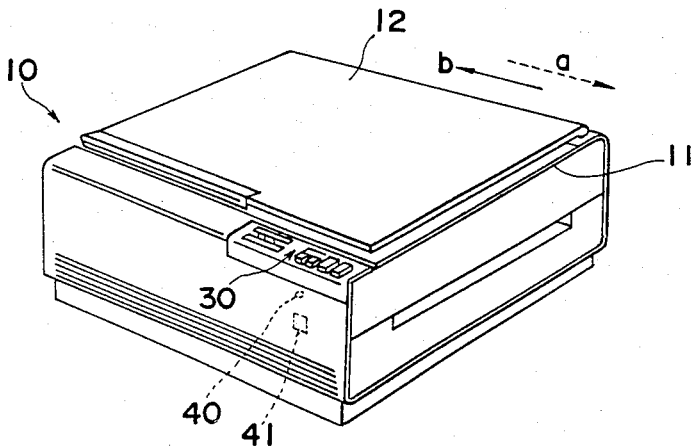
FIG. 1 is a perspective view showing the outer appearance of a copying machine embodying the present invention.

Before the description of the present invention proceeds, it is to be noted that like parts are designated by like reference numerals throughout the accompanying drawings.

Figure 2:
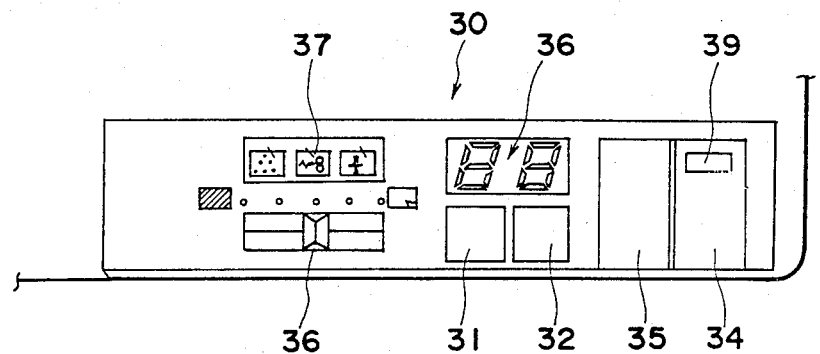
FIG. 2 is a front elevational view of a portion of the copying machine, showing the details of a control panel.
Figure 3:
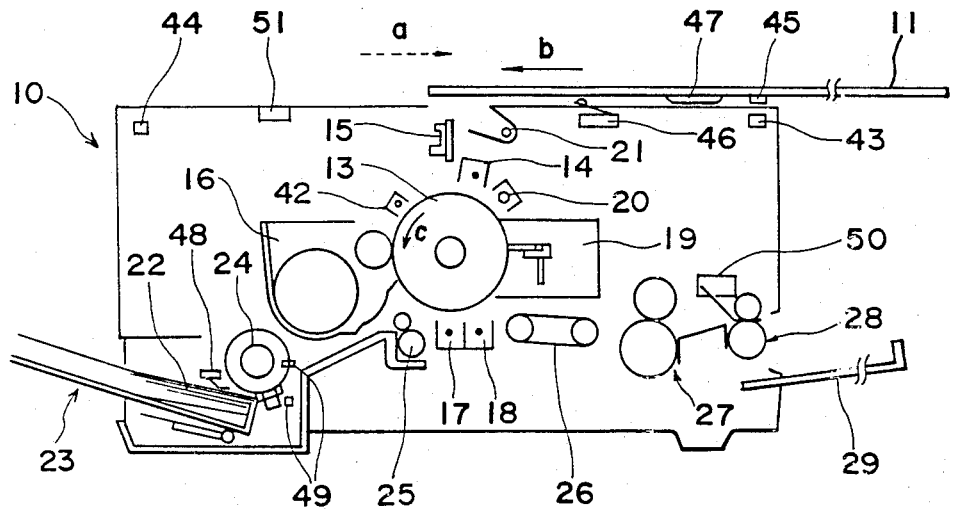
FIG. 3 is a schematic side view of the copying machine, showing internal mechanisms thereof.

Referring first to FIGS. 1 to 3, an electrophotographic copying machine embodying the present invention comprises a cabinet 10 of a generally rectangular box-like configuration including a generally rectangular movable transparent support 11 made of, for example, a clear glass plate, and supported on the top of the cabinet 10 for reciprocal movement between a start position, as shown in FIG. 3, and a scanned position in a direction parallel to, for example, the longitudinal sense of the cabinet 10 together with a hingedly supported flexible or foldable cover 12. The transparent support 11 is for the support thereon of an original bearing one or more images to be copied, which original is, after having been placed on the transparent support 11 with the image facing downwards, i.e., in any direction opposite to the cover 12, covered by the cover 12 to make the original flat against the support 11. The image of the original so placed on the support 11 is adapted to be relatively scanned by an optical system, as will be described later, so that it can be optically projected onto a photoreceptor drum 13 as will be described later.

The copying machine so far shown also includes a function switch 40 for effecting a changeover between normal and function modes of operation and a trouble counter 41 for displaying ??? if the location of a trouble occurring in the copying machine. Both the switch 40 and the counter 41 are arranged on a front panel of the cabinet 10.

The cabinet 10 has a control panel 30 disposed on the top of the cabinet alongside the transparent support 11 and above the switch 40 and the counter 41 and at a position convenient to the access of an operator or user of the machine thereto. The control panel 30 includes a keyboard, comprised of a tenth digit key 31 and a unit digit key 32 for entering the desired number of copies to be made, a print key 34, a clear-and-stop key (hereinafter referred to as a "C/S key") 35, an adjustment knob 36 for adjusting the shading or contrast of the image to be reproduced on a copying paper, a display window 37 having respective display areas for indicating the occurrence of a paper jamming in the machine, the consumption of any one of the copying papers and the toner below a respective critical value and the necessity of calling a servicing person, a digit display window 38 for displaying the number of the copies desired to be made which has been entered by manipulating one or both of the digit keys 31 and 32, and a power-on indicating lamp 39 for, when lit, indicating that an electrical power is being supplied to the machine.

As best shown in FIG. 3, the copying machine comprises, in addition to the photoreceptor drum 13 supported within the cabinet 10 for rotation in one direction shown by the arrow, an electrostatic charger 14, an optical system 15 comprised of an array of bundled light transmitting fibers, a sub-eraser lamp 42, a developing unit 16, a transfer charger 17, an A.C. charge eraser 18, a cleaning unit 19, and an eraser lamp 20, all disposed around the photoreceptor drum 13 in the order given above with respect to the direction of rotation of the drum 13, the function and construction of each of these component parts being well known to those skilled in the art.

The machine includes a start position detecting switch 43 and an overrun detecting switch 44 which are so installed on the cabinet 10 and so positioned below the path of movement of the transparent support 11 that, when the transparent support 11 is in the start position, the start position detecting switch 43 can be activated by a magnet 45 carried by the support 11 to generate an electrical signal indicative of the positioning of the support 11 to the start position, but when the support 11 arrives at the scanned position, the overrun detecting switch 44 can be activated by the magnet 45 to generate an electrical signal necessary to cause the support 11 to return from the scanned position towards the start position. The cabinet 10 carries a paper feed control switch 46 disposed along the path of the movement of the transparent support 11 and adapted to be activated by a cam member 47, secured to the support 11, as the latter moves from the start position towards the scanned position, to generate an electrical signal necessary to cause a paper feed roller assembly 24 to rotate in a predetermined direction for initiating the feed of copying papers 22 one at a time from a paper supply unit 23 towards an image transfer station in synchronism with the rotation of the photoreceptor drum 13.

The transparent support 11 is, when and so long as it is not at the start position as shown in FIG. 3, but at a home position as shown in FIG. 1 which is generally intermediately between the start and scanned positions, moved towards the start position as shown in FIG. 3 upon initiation of the copying operation. During the movement of the support 11 from the home position towards the start position, an illuminator lamp 21 is preliminarily lit, but is lit on a full scale simultaneously with the start of movement of the support 11 towards the scanned position which takes place subsequent to the arrival of the support 11 at the start position. The image of the original on the support 11 is consecutively scanned by generally ribbon-shaped rays of light from the illuminator lamp 21 as the support 11 moves from the start position towards the scanned position, which rays of light are, after having been reflected from the original, projected onto the photoreceptor drum 13 to form on the drum surface an electrostatic latent image corresponding to the image of the original.

A stack of copying papers 22 accommodated in the supply unit 23 are fed one at a time by the feed roller assembly 24 driven in synchronism with the movement of the support 11 from the start position towards the scanned position and is then fed towards the transfer station after having been synchronized by a timing roller assembly 25 with the arrival of the electrostatic latent image on the drum 13 at the transfer station. At the transfer station, a powder image formed on the drum 13 by the application of toner particles to the electrostatic latent image as the drum 13 has passed through the developer unit 16 is transferred onto the copying paper 22, the copying paper 22 with the powder image thereon being in turn supplied to a fixing unit 27 past the charge eraser 18 by means of an endless belt 26. The powder image on the copying paper so fed to the fixing unit 27 is fixed thereon as it passes through the unit 27, and the copying paper with the powder image fixed thereon is subsequently delivered onto a tray 29 by means of a delivery roller assembly 28. The photoreceptor drum 13, after the powder image has been transferred from the drum 13 onto the copying paper, continues to rotate sequentially past a cleaning station, at which the residual toner particles on the drum surface are removed by the cleaning unit 18, and an erasing station at which the residual electrostatic charge on the drum surface is removed by the illumination of the eraser lamp 20 in readiness for the next succeeding copying operation.

Disposed above the paper supply unit 23 and in alignment with the path of feed of the copying papers 22 is an empty detecting switch 48 for detecting the presence or absence of the papers in the supply unit 23, which switch 48 is operable to interrupt the copying operation in the event that the supply unit 23 becomes empty of any copying paper. Whether or not the copying paper 22 has been supplied can be detected by a detecting switch 49 which may be constituted by a photo interrupter and which is operable to detect the passage therethrough of the trailing end of the copying paper with respect to the direction of feed towards the transfer station and to generate, when it so detects, an electrical signal necessary to cause the transparent support 11 to return towards the start position. Whether or not the copying paper bearing the fixed powder image thereon has been delivered onto the tray 29 can be detected by an ejection detecting switch 50.

The number of copying operations repeated can be counted by a total counter 51 which may be a general purpose counter if it can perform a counting operation per pulse. However, the counter 51 should not be of a type in which the count value can easily be falsified or counted down.

The copying machine of the construction and function as hereinbefore described is so designed that, by manipulating one or both of the digit keys 31 and 32 on the control panel 30 prior to the initiation of the copying operation, the desired number of copies to be made can be preset to the machine on the one hand and displayed through the display window 36 on the other hand. Therefore, the copying machine can repeat its copying operation in a number of times equal to the desired number of copies to be made which has been preset and displayed. The sequence of operations of the copying machine including the presetting of the desired number of copies to be made and the control of repetition of the cycle of copying operation can be controlled by, for example, a microcomputer MC shown in FIG. 4.

Figure 4:
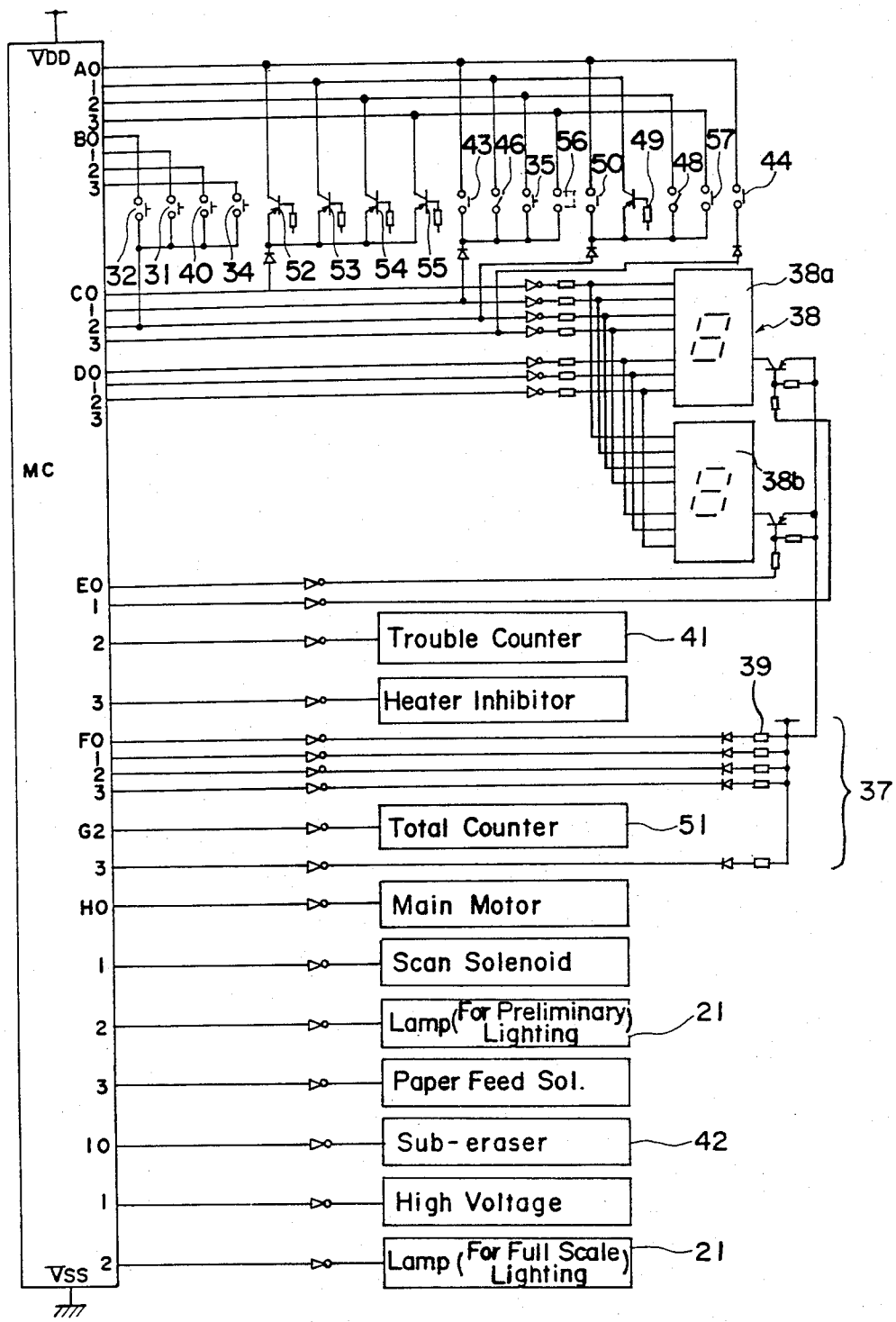
FIG. 4 is a schematic circuit diagram showing the connection between a microcomputer used to effect the sequence control of the copying machine and the display unit for displaying the number of copies to be made.

Although not shown, the microcomputer MC comprises, as its internal devices, a central processing unit (CPU), a read-only memory (ROM), a random access memory (RAM) and an accumulator (ACC), all being well known to those skilled in the art. As shown in FIG. 4, the microcomputer MC is adapted to receive input signals from one or both of the digit keys 31 and 32, the function switch 40, the print key 34, a transistor 52 adapted to be operated by an electric signal indicative of the detected failure of a high voltage transformer, a transistor 53 adapted to be operated by an electrical signal indicative of the detected failure of the illuminator lamp, a transistor 54 for detecting the failure of a main eraser, a transistor 55 adapted to be operated by a wait signal, the start position detecting switch 43, the paper feed control signal 46, the C/S key 35, an F5 switch 56, the ejection detecting switch 50, the paper end detecting switch 49, the empty detecting switch 48, a toner detecting switch 57, and the overrun detecting switch 44, respectively, and to generate in response, in accordance with a predetermined program, a control signal necessary to control the digit display at the display window 36, a signal necessary to effect increment of the count of the total counter 51 and another control signal necessary to control the copying machine in such a way as to cause the copying operation to be repeated a number of times equal to the number displayed through the display window 38.

The "F5" switch 56 is a switch for setting in a function mode "II" and can be manipulatable only during the assembly of the copying machine at a factory. Generally, this switch 56 cannot be manipulatable by any person including a servicing person, nor is any person taught how to manipulate this switch 56. In practice, this switch 56 is installed on a printed circuit board to be set at a position where, after the fabrication, is not accessible. By way of example, it is better to provide terminals (connectors) on a substrate and then to short-circuit these terminals so that an extra function mode "5" (total counter setting) can be provided in addition to the function which can normally select "1" to "4". Accordingly, if these terminals are left open after the shipment, no function mode "5" for the total counter setting can be used.

Figure 5:
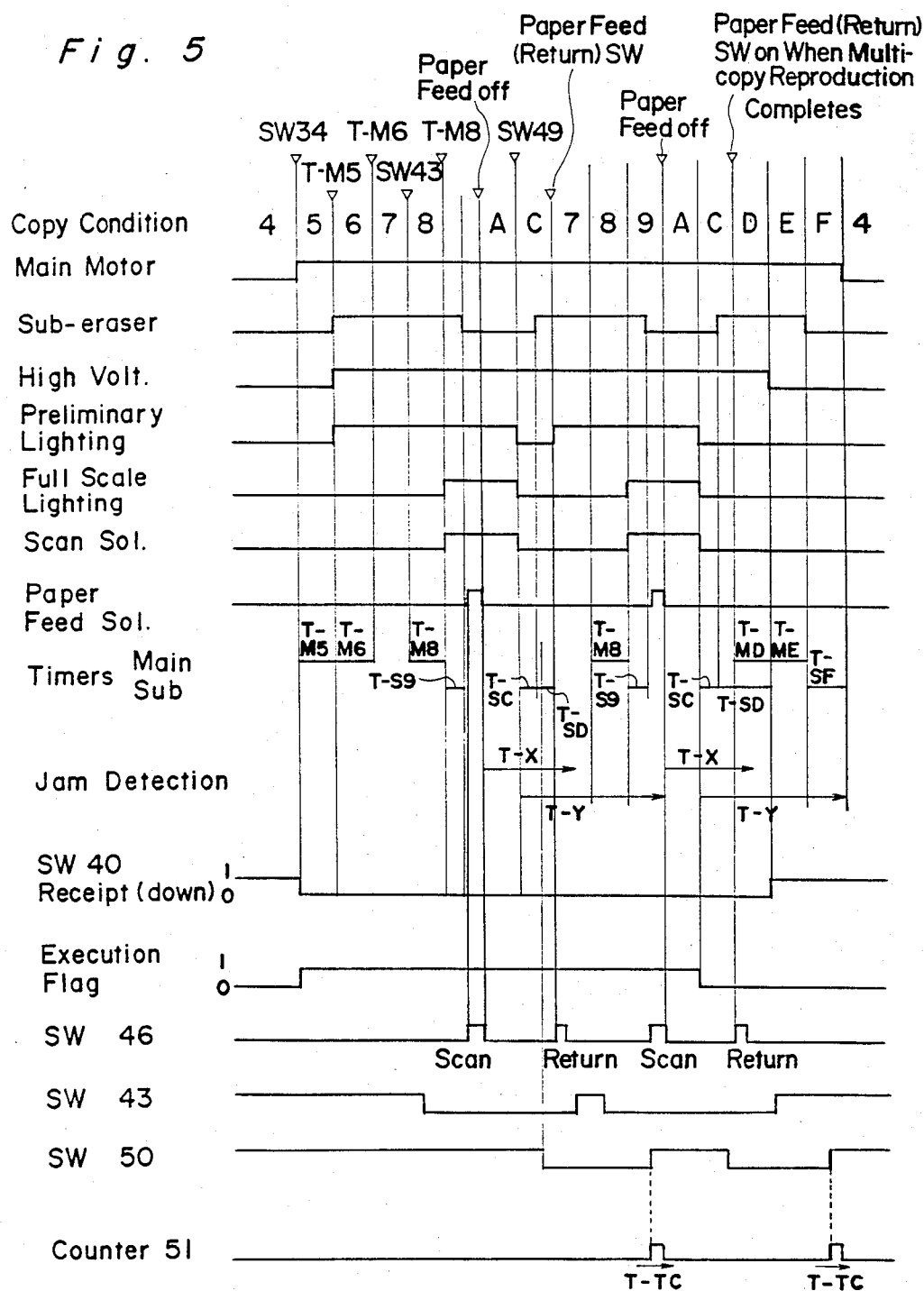
FIG. 5 is a time chart showing the sequence of operation of the copying machine.

Hereinafter, the details of the operation of the copying machine embodying the present invention will be described with reference to the time chart shown in FIG. 5 and also to the flow charts shown respectively in FIGS. 6 to 22.

Figure 6:
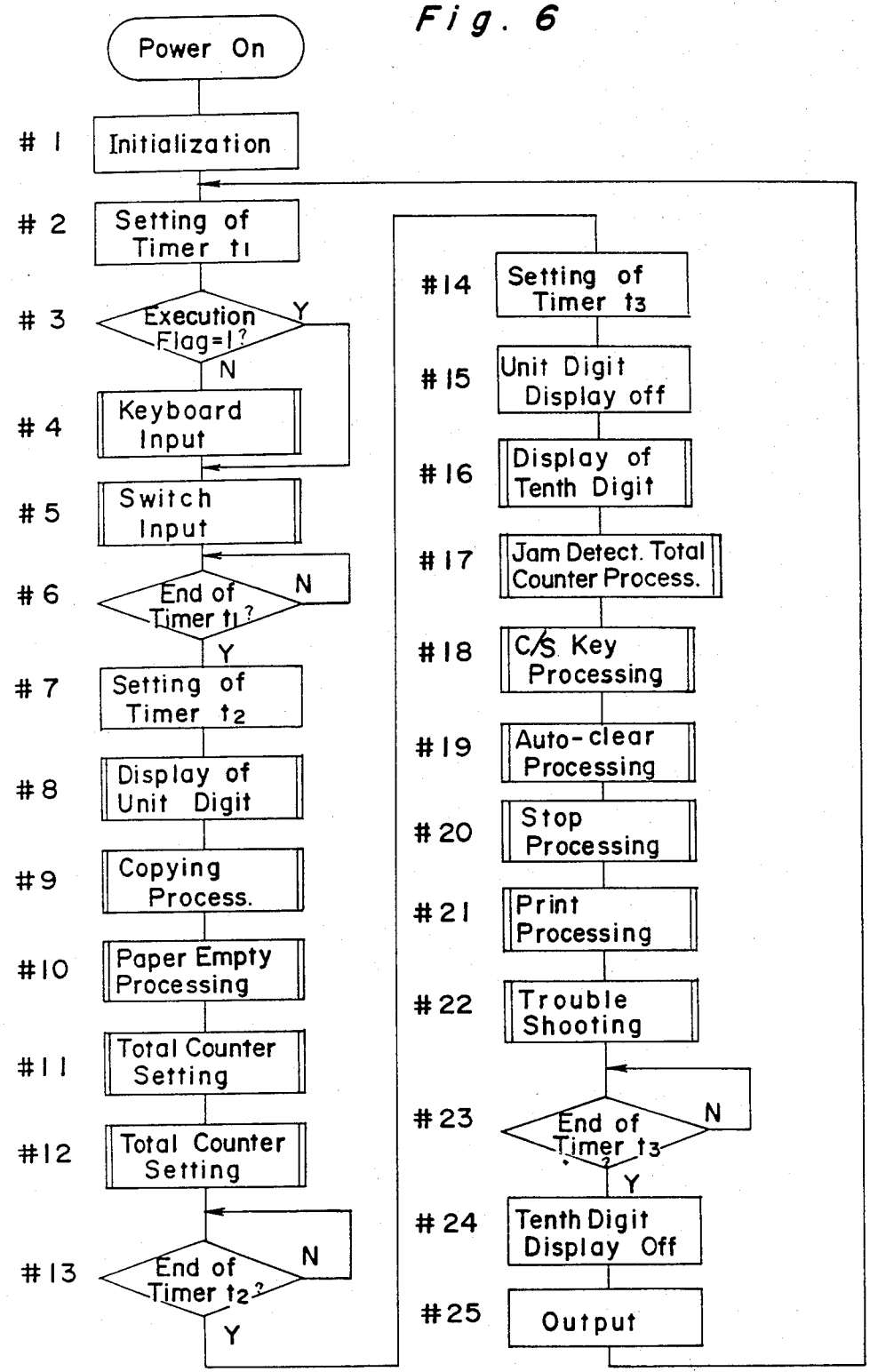
FIG. 6 is a flow chart showing the sequence of control to be effected to the copying machine.

FIG. 6 illustrates the sequence of entire control of the copying machine embodying the present invention.

Assuming that an electrical power has been supplied to the machine, initialization takes place at the first step #1. This initialization includes execution of such procedures required to be done subsequent to the supply of the electrical power to the copying machine as including the setting of a heater failure timer T-HT, the manipulation of the keyboard to enter digits representative of the number of copies desired to be made, the setting of a single copy to a keyboard saving memory, the clearing of the memories and others.

Subsequently, although at the steps #2, #7 and #14, internal timers t1, t2 and t3 are respectively set, the internal timers t2 and t3 determine the respective times during which the unit and tenth digits composing the number of copies to be made are displayed. Since a cycle of the process from the step #2 to the step #25 is repeatedly executed in a predetermined period of time, this predetermined period of time for each cycle provides a reference time at which timers other than the internal timers (for example, timers T-M5, T-M6 and others, which are adapted to be counted up per routine) are driven to perform their counting operation.

At the subsequent step #2, the internal timer t1 is set. Timer t1 represents the time that it takes from the initial setting of the internal timer until the display of the unit digit and which is set longer than the time required to perform the keyboard input (at the step #4) and the switch input (at the step #5), thereby fixing the processing time during this period. When the termination of the internal timer t1 is detected at the step #6, the internal timer t2 is set to be slightly longer than the time required until the tenth digit is displayed with the display time for the unit digit consequently determined.

When the termination of the internal timer t2 is detected at the step #3, the internal timer t3 is newly set and this timer t3 is set to be slightly longer than the time required to perform the processing until the output step

25 with the display time for the tenth digit being consequently determined.

When the termination of the internal timer t3 is detected at the step #23 during the tenth digit display, the tenth digit display disappears at the step #24 and the contents of a load output RAM in a memory are outputed to an output port at the step #25 and are controlled.

Since the processing time at the output is fixed, the time, or loop time, required to perform each loop from the setting of the internal timers to the completion of the outputing, (the processing time required to perform each routine), becomes fixed from, [Input], [Unit Digit Display], [Tenth Digit Display] and [Output].

Since the time required for the input processing is 3.78 ms, the display times t2 and t3 for the display of the unit and tenth digits are 6.3 ms, respectively, and the time required for the output processing is about 0.6 ms, the loop time (the processing time required to perform each routine) is about 17 ms.

Figure 7A:
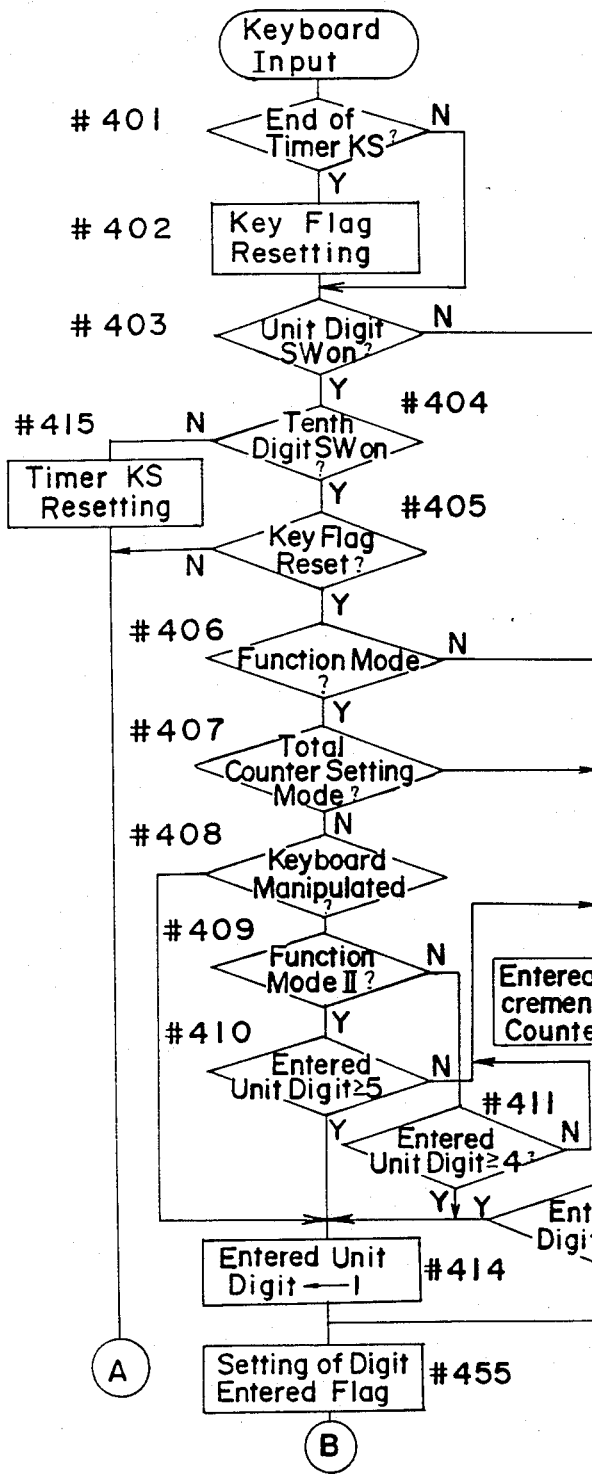
FIG. 7 is a flow chart showing the details of the control effected at the step #4 shown in FIG. 6.
Figure 7:
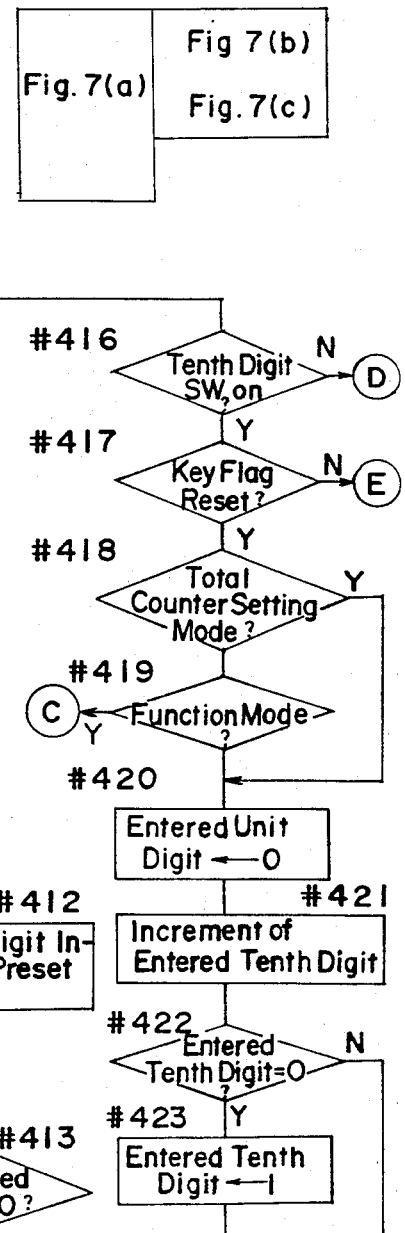
Figures 7B, 7C:
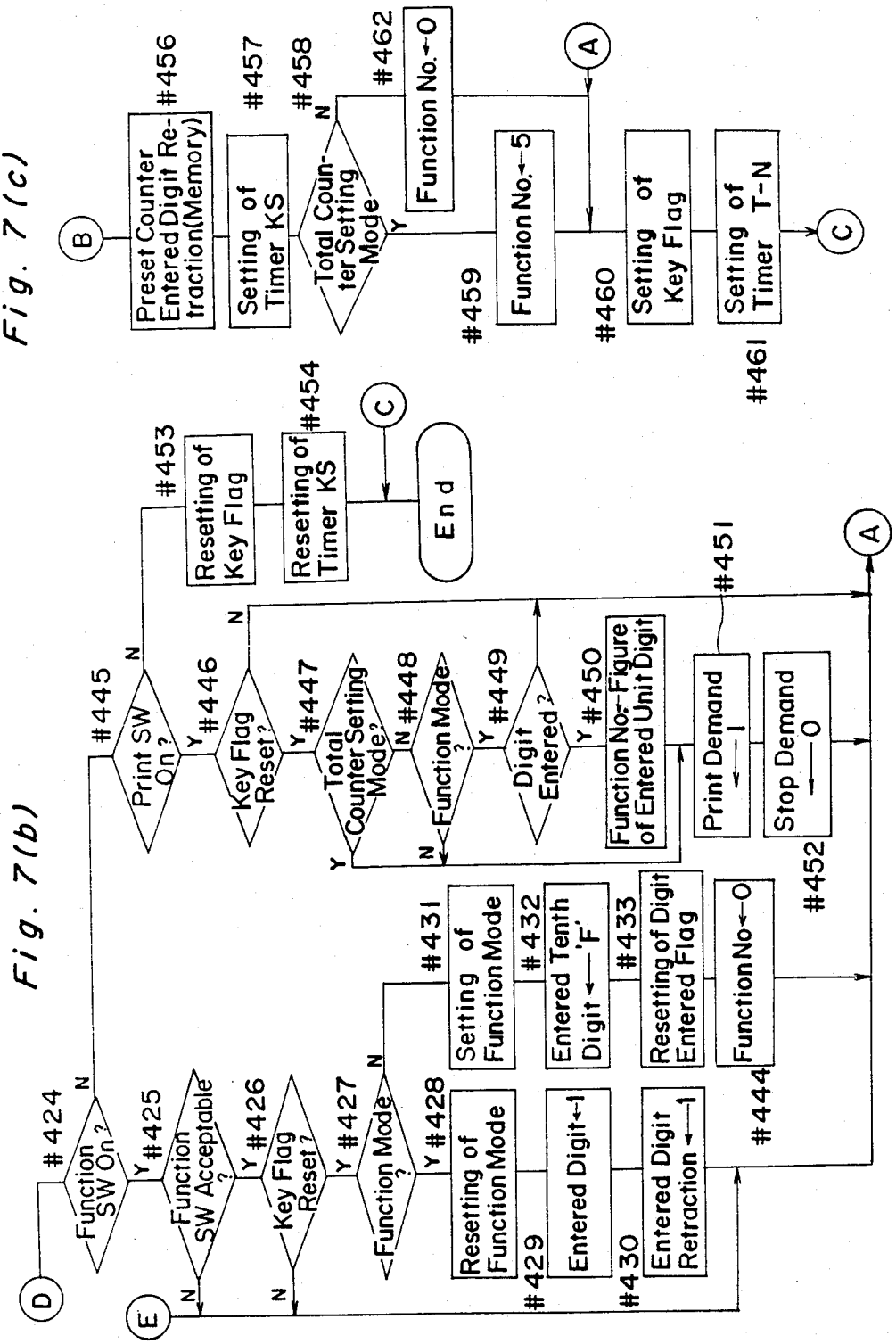

The details of the keyboard input (the step #4) are shown in and will be described with reference to FIG. 7.

Before the supply of inputs from the keyboard, whether or not they can be acceptable is judged. The keys (the digit keys, the function key and the print key) are not accepted during the execution of the machine operation (such as copying operation and function operation).

If the inputs from the keyboard are acceptable, a keyboard input processing is performed. At the step #401, it is determined whether or not a timer KS has terminated. The timer KS is a timer for determining an entered digit increment interval time so long as the digit keys 31 and 32 continue to be depressed and, when the timer KS terminates, a key flag is reset at the step #402 to a condition similar to the condition which is established when the digit keys once depressed are again depressed.

When the unit and tenth keys 31 and 32 are successively depressed at the respective steps #403 and #404, the step #415 starts at which the timer KS is reset to prevent the increment of the next succeeding digit entered, followed by the step #460 at which the key flag is reset and an auto-clear timer T-N, as will be described later, is subsequently set at the step #461, thereby completing the entry of the inputs from the keyboard.

If the unit and tenth keys 32 and 31 are on and off, respectively, the step #403 is followed by the step #404 and then by the step #405 at which the determination is made as to the key flag. In the event that any of the unit and tenth keys are switched from the non-depressed conditions over to depressed conditions (the step #405 Y), the step #405 is followed by the step #406, or otherwise the step #405 is followed by the step #460 to set the key flag.

At the step #406, the function mode is determined. If it is a function mode (the step #406 Y), the entered digit permits the increment of "1" to "4" or "5" (In the case of the function mode "II", the "F5" switch is on.) whereas, if it is a normal mode (not the function mode) (the step #407 Y), a digit from "1" to "9" and "0" can be entered.

If it is the function mode, but not the total counter setting mode (#407 N), whether or not the digit has been entered is checked. The condition in which the digit has not yet been entered is the condition in which, although the function mode has been established by depressing the function switch 40, the function number has not yet been set, and this condition is displayed [F⎕] as will be described later.

In the event that the unit and tenth keys 32 and 31 are off and on at the respective steps #403 and #416, after the key set-up (resetting of the key flag) has been determined at the step #417, the total counter setting mode is determined at the step #418 and, if it is one of the function modes excluding the total counter setting mode (the step #419 Y), the keyboard input is terminated with the tenth key 31 being no longer accepted. If it is a key set-up (the step #417 Y), the unit digit entered is forcibly zeroed at the step #420 and the increment is effected to the tenth digit at the step #421. Since the unit digit reads zero when the tenth digit reads zero (the step #422 Y), the tenth digit is set to read 1 at the step #423 thereby to avoid any display of "00".

When the keyboard is manipulated (that is, when one or both of the unit and tenth keys 32 and 31 are depressed) and is accepted as a key set-up, the step #456 is initiated with the entered digit retracted and, at the step #457, the timer KS (for the entered digit increment interval) can be set.

If it is the total counter setting mode (the step #458 Y), the digit "5" is entered at the step #459 as a function number being executed, or otherwise it is cleared at the step #462 and, subsequently, the both proceed to the step #460.

At the step #424 Y at which the function switch 40 is depressed and at the step #425, whether or not it can be acceptable is determined. The time during which it can be accepted is the time which appears to affect the previous function such as the copying operation or the execution of the function.

When and after the function switch 40 has been accepted accompanied by the key set-up (the step #426 Y), whether or not the time at which the function switch 40 has been depressed is during the function mode is determined at the step #427. By this determination, the function mode or the normal mode is established if it is the normal mode of the function mode, respectively.

When the function mode step #431 is established, the tenth digit place is displayed "F" at the step #432 and it is determined at the step #433 that no digit is entered, and at the step #444, the function number is cleared.

At the time of return to the normal mode (the step #428), the entered digit reads 1 at the step #429.

In the event that the print key 34 is depressed (at the step #445 Y), the key is set up (at the step #446 Y) and the digit is entered (at the step #449 Y) during the function mode (the step #448 Y), the unit digit figure is set to the function number being executed at the step #450. Subsequently, a print demand flag is set at the step #451 and a stop demand flag is reset at the step #452.

Should any key be depressed (the step #445 N), a key flag for the purpose of determination of the key set-up is reset at the step #453 and the timer KS is then reset at at the step #454.

Since the auto-clear timer T-N to be set at the step #461 is always set whenever any one of the keys has been depressed, the timer T-N starts its counting operation when the key is released and a condition necessary to start the counting operation is established. The timer T-N is a timer used to set an input condition to a standard condition, that is, the same condition as the initialization at the step #1, when it has been timed up. In other words, any manipulation is effected to the copying machine during a predetermined period of time, the input condition is initialized.

Figure 8:
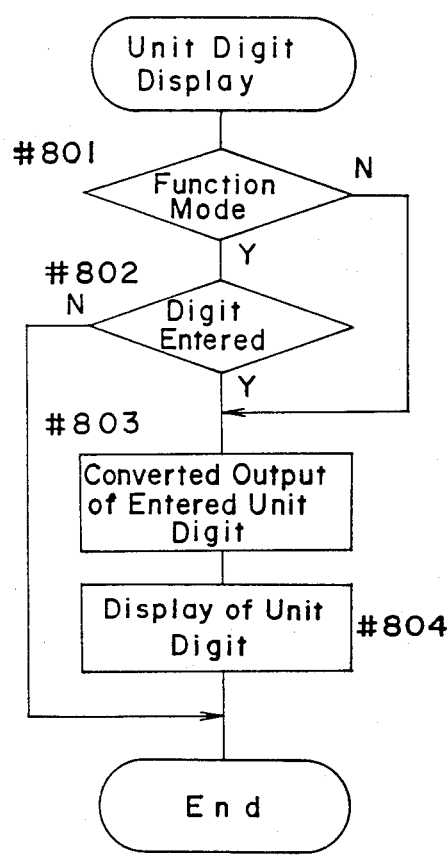
FIG. 8 is a flow chart showing the details of the control effected during the unit digit display at the step #8 shown in FIG. 6.

The details of the unit digit display (the step #8) will now be described with reference to FIG. 8.

For the unit digit display, subsequent to the termination (the step #6 of FIG. 6) of the internal timer which has been set before the keyboard input and, then, subsequent to the termination of t1, the internal timer t2 for the display time for the unit digit is newly set at the step #7.

If not the function mode (the step #801 N), a converted output of the entered unit digit is generated at the step #803, but if the function mode (the step #801 N), it is determined at the step #802 that the digit has been entered.

The converted output referred to above means an output representative of binary digit data which have been converted into respective elements of the 7-segment display device 38 for the purpose of enabling the CPU to directly drive the display device 38.

The condition in which the digit has not yet been entered (the step #802 N) is a condition established when the C/S key 35 is depressed when the function mode is established by function switch 40 or when the function is not executed and, during this condition, the unit digit place is not displayed, but F☐ is displayed.

Figure 9:
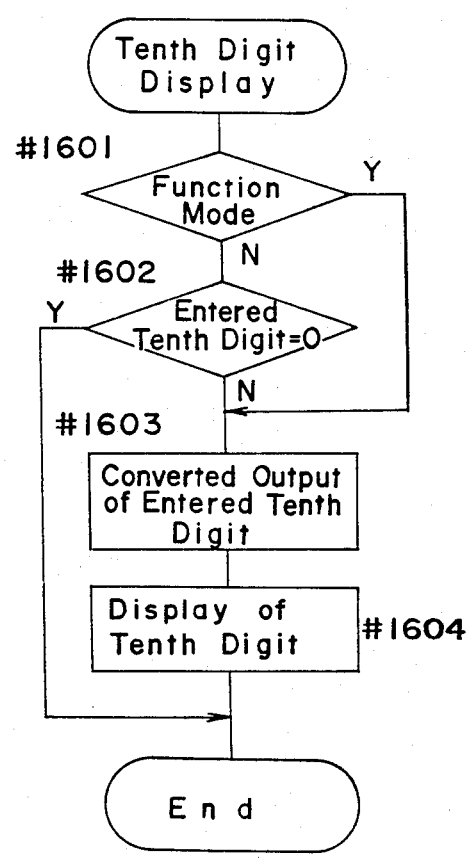
FIG. 9 is a flow chart showing the details of the control during the tenth digit display at the step #16 shown in FIG. 6.

The tenth digit display (the step #16) will now be described in detail with reference to FIG. 9.

Even the tenth digit display is similar to the unit digit display. However, during the function mode (the step #1601 Y), the tenth digit is with no fault displayed at the step #1603, whereas during the normal mode (the step #1601 Y), no tenth digit is displayed if it is zero (the step #1602 Y).

Even the tenth digit entered is converted and outputed, there is a symbol display of F other than the display of a digit from "0" to "9" in the case of the tenth digit (In the actual program, if the value of "A" ("10" according to the decimal system) is included in the tenth digit, the F display is effected.). Subsequent to the emergence of outputs from ports Co to C3 and Do to D3 after having been converted, a port E1 is outputed for effecting the display of the tenth digit and the tenth digit display is then lit.

The details of the copying process (the step #9) will now be described with reference to FIG. 10.

The copying process is performed depending on the operative condition. With respect to the copying operation, conditions (5) and (6) are preliminary processes, conditions (7) to (A) are scanning operations, a condition (C) is a return operation and conditions (D) to (F) are post-processes. In case of a single copy, the condition starts from (5) and terminates at (F), but in case of a multi-copy, the condition is transferred from (C) onto (7).

The conditions (D) to (8) are, in practice, used for a preliminary rotation and the function operation (functions "2", "3" and "4").

The condition (4) is a stand-by condition. Upon completion of the copying operation, the condition shifts from (F) to (4), returning to the stand-by condition. The condition (B) is empty.

A timer associated mainly with the copying operation is constituted by a main timer and a sub-timer. The main timer is operable to shift one condition to the next succeeding condition upon termination of the timer. The sub-timer is used as a control timer during the condition except for T-SD.

The copying condition (5) shown in FIG. 10 will be described with reference to FIG. 11.

When the first copy is being made subsequent to the depression of the print key 34, the condition is shifted to (5). At the set-up (the step #9-501) at which the condition has become (5), a timer T-M5 operable to determine the length of the condition (5) at the step #9-502 is set. T-M5 is the timer for the determination of the stand-by time for delaying the time, at which the next succeedng load is to be invested, for a period of time required for the main motor to be set up.

At the step #9-503, the main motor is turned on and, at the step #-504, the acceptance of the function switch 40 is inhibited.

When the timer T-M5 terminates (at the step #901), the increment is effected to the condition at the step #902 to shift the condition from (5) to (6).

By the switching on of the main motor (at the step #9-503), a return drive is mechanically transmitted to the transparent support to return the latter to the start position if the transparent support is not in the start position and continues until the start position switch is turned on (at the step #9-701) during the condition (7).

The copying condition (6) shown in FIG. 10 will be described with reference to FIG. 12.

At the set-up of the condition (6) (the step #9-601), a main timer T-M6 is set (at the step #9-602). This T-M6 is a timer for the determination of the preliminary processing time of the copying operation and has a preset time effective to utilize the surface area, where a transfer charge is applied, always within the area where the image has been formed. At the succeeding steps #9-603, #-604 and #9-605, the sub-eraser, the high voltage and the preliminary lighting are turned on, respectively.

The copying condition (7) shown in FIG. 10 will now be described with reference to FIG. 13.

After the lapse of the preliminary processing time of the copying operation, a check is made as to whether or not the transparent support is held at the start position (the step #9-701). If it is at the start position, the next succeeding scanning starts.

The copying condition (8) shown in FIG. 10 will now be described with reference to FIG. 14.

Although the next succeeding scanning starts when the transparent support 11 has returned to the start position, since there is a time lag from the moment the start position detecting switch 43 is turned on to the moment the mechanical drive to the transparent support 11 is interrupted in the case where the transparent support 11 is returned, the time at which the scanning is to be initiated is delayed by a timer T-M8 at the step #9-802 for a period of time corresponding to such time lag.

The copying condition (9) shown in FIG. 10 will now be described with reference to FIG. 15.

At the set-up of the copying condition (9), a scan solenoid (the step #9-904) and the illuminator lamp 21 (the step #9-903) are lit on full scale and, at the same time, a sub-timer T-S9 is also set (the step #9-902). This is for switching off the sub-eraser 42 to initiate the image formation. A drive failure timer T-ST (the step #9-906) is a timer for regulating the time during which detection can be made as to whether or not the transparent support 11 has actually departed from the start position detecting switch 43 subsequent to the transparent support 11 being driven and has a preset time which may terminate at the time of the set-down of the paper feed control switch 46 (the step #9-918) so as to process during the condition (9).

Although a paper feed solenoid is turned on during the on state of the paper feed control switch 46, an AND logic between an on output of the paper feed control switch 46 and a turning on output signal of the microcomputer MC, is in practice utilized to effect a fine adjustment because the microcomputer MC receives inputs and generates outputs for each routine and, if the paper feed solenoid is controlled solely by the output from the microcomputer MC, the front resist can do nothing other than to vary step by step.

At the set-up of the paper feed control switch 46, the failure of a high voltage transformer is detected (the step #9-912) and, at a timing at which a new paper feed is not initiated, the failure detection is done.

At the start of the paper feed, check is made as to whether or not the paper supply unit has become empty (the step #9-914) and, in the event that it has become empty, the copying operation is terminated (the step #9-916) and proceeds to the post-processes.

When the paper feed control switch 46 sets down (the step #9-918 Y), the paper supply is terminated (the step #9-919) and the next succeeding condition is initiated (the step #9-920) to set a leading end jam detection timer T-X (the step #9-921).

Upon this termination of the paper feed, the timing roller assembly is driven to effect the supply of the copying paper towards the transfer station and, therefore, leading ends of the copying papers of different sizes can be detected by the same timer.

Although at the step #9-904, the scan solenoid is switched on in response to the setup of the condition (9), the scan time is cleared at the step #9-905 because the counting of the scan time is also performed at the same time.

An error occurring in the copying paper supply is judged in the following manner.

In the event that the trailing end detecting switch 49 fails to detect the paper at the timing (the step #9-918 Y) of the set-down of the paper feed control switch 46 (the step #9-918' N), it is determined as a paper supply error and, consequently, the condition is shifted to (D) at the step #9-918".

Since the jam detection timers T-X and T-Y have not yet been set at this time, the operation associated with the jam detection is not executed.

When the paper supply error has been detected by the erroneous operation of the trailing end detecting switch 49, the paper is supplied while the jam detection is cancelled and, since the condition (D) shifts to (E) and (F) with an auto-shut being effected, the paper may remain at the time of termination of the auto-shut.

Although not specifically shown, a similar phenomenon will take place when the paper 22 is fed during the function mode while the jam detection is cancelled.

Figure 16:
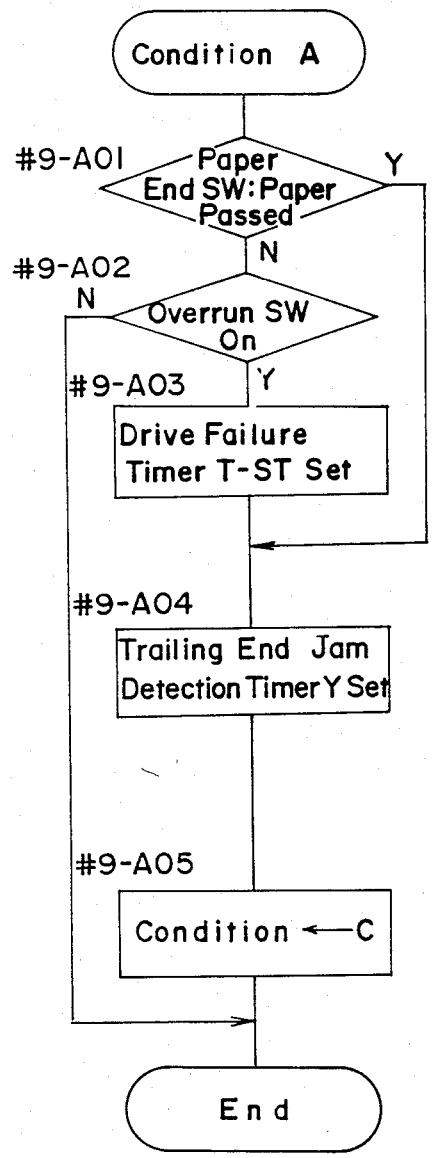

The copying condition (A) shown in FIG. 10 will now be described with reference to FIG. 16.

When the condition (A) is initiated upon the termination of the paper supply (the step #9-920), a check is made as to whether or not the copying paper 22 has moved past the trailing end detecting switch 49 (the step #9-A01). If it has moved, the condition shifts to condition (C) (the step #9-A05) and the scanning terminates (the step #9-C05). This is true even when the overrun detecting switch 44 is turned on (the step #9-A02 Y).

In the illustrated copying machine, a return signal for the transparent support 11 can be obtained when the trailing end of the copying paper 22 moves past a photo sensor 49 positioned on the leading side of the paper 22 feed roller assembly 24 (a so-called random return type). Accordingly, there is provided the overrun detecting switch 44 for forcibly returning the transparent support 11 when the length of the copying paper 22 is of a value greater than a predetermined length.

Before the condition shifts to (C), the trailing end jam detection timer T-Y is set (the step #9-A04).

At the time of termination of the scanning at which the overrun detecting switch 44 is turned on, the drive failure timer T-ST is set at the step #9-A03 and monitors until the overrun detecting switch 44 is turned off.

In other words, the timer T-ST for the detection of the drive failure has a preset time somewhat longer than the length of time from the switching on of the overrun detecting switch 44 to the switching off thereof incident to the return, and is adapted to be set (the step #9-A02 and the step #9-A03) in response to the switching on of the switch 44 and to be reset (cleared) (the steps #9-C12 and #9-C13) in response to the switching off of the switch 44. Accordingly, unless it is reset within the preset time, the drive failure is determined as occurring (Refer to #2209 of the step #22.).

Figure 17:
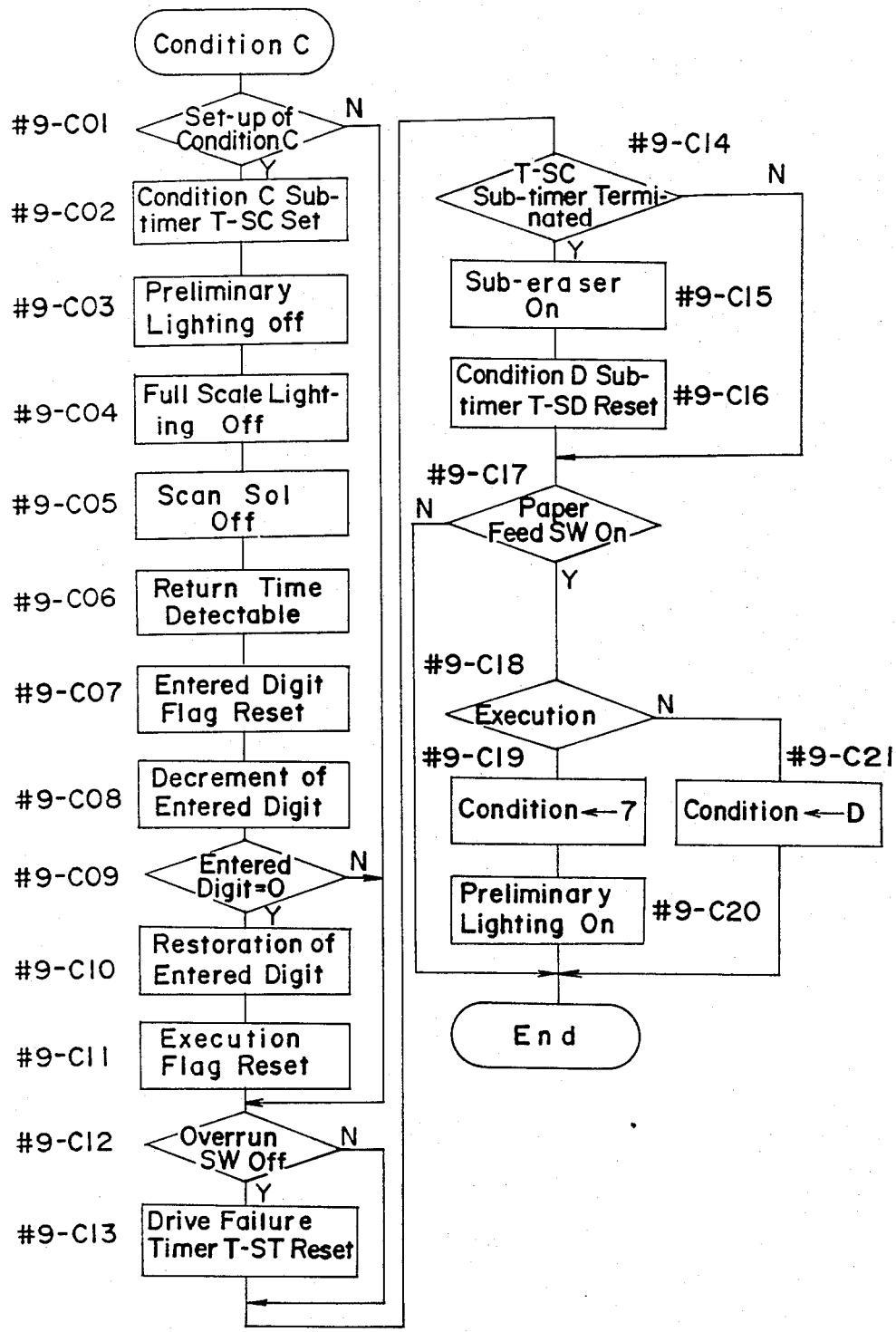
Figure 19:
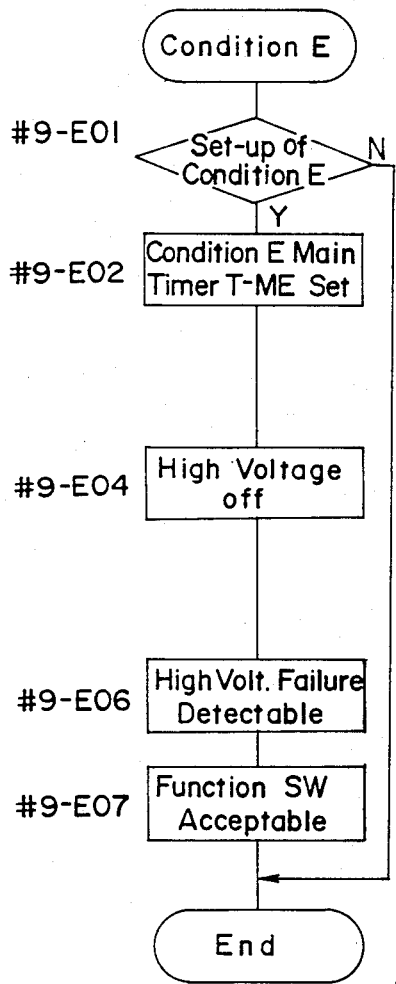

The copying condition (C) shown in FIG. 10 will now be described with reference to FIG. 17.

In response to the set-up, the scanning operation is terminated (the step #9-C05) and, also, an entered digit flag is reset (the step #9-C07).

Upon termination of the scanning operation, decrement is effected to the entered digit (the step #9-C08) and, if the result is found to be zero (the step #9-C08 Y), the entered digit once retracted is restored (the step #9-C10) with the preset copy number being displayed and the execution flag is then reset (the step #9-C11), thereby transferring to the post-processes (the conditions (D) to (F)) to be done subsequent to the copying operation (the step #9-C21).

If the result of the decrement is not zero (the step #9-C09 N), the execution flag will not be reset and the copying operation continues (the steps #9-C18 Y, #9-C19 and #9-C20).

When the sub-timer T-SC terminates at the step #9-C14, the sub-eraser (inter-image eraser) is turned on (the step #9-C15) and a sub timer T-SD is set (the step #9-C16). This timer is a timer for the high voltage switching off and, since during the multi-copying operation there is no judgement as to the termination of this sub-timer under the conditions (7) and (8), the high voltage is not switched off. However, during the execution of the terminating process of the copying operation, the high voltage is switched off under the condition (D) upon completion of this timer (the steps #9-D08 #9-E04).

When the paper feed control switch 46 is turned on incident to the return of the transparent support 11 (the step #9-C17 Y), the execution flag is determined (the step #9-C18) and, if it is set (the step #9-C18 Y), the condition is transferred to (7) (the step #9-C19) and the preliminary point is turned on (the step #9-C20) to effect the multi-copying operation. If the execution flag is reset (the step #9-C18 N), the condition is transferred to (D) (the step #9-C21) to effect the post-processes.

In the event that at the time of final copying operation, even through the execution flag is reset (the step #9-C11) in response to the set-up of the condition (C), the execution flag is set by the continued depression of the print key until this paper feed control switch 46 is turned on during the return of the transparent support 11 (See #2109 of the step #21), no post-process take place to the multi-copying operation.

Figure 18:
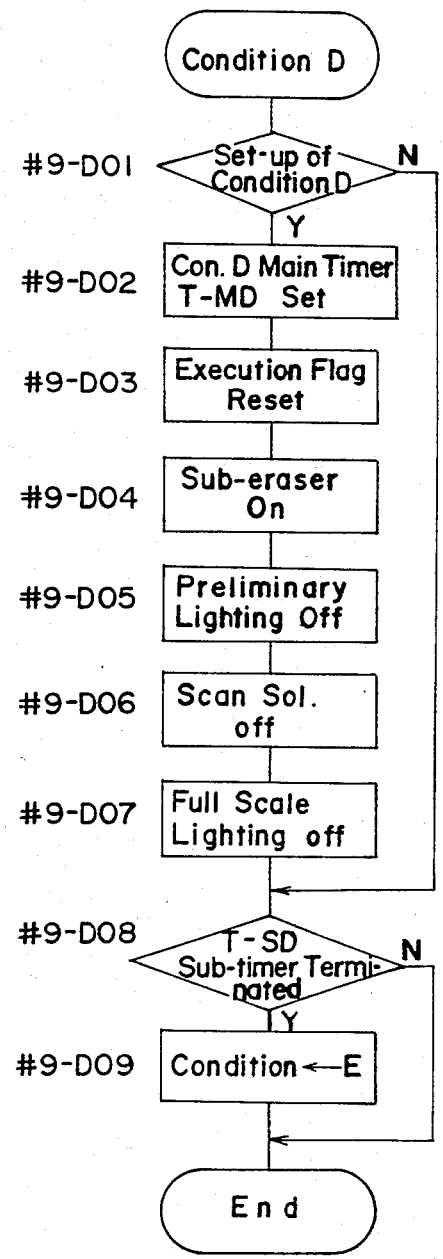

The copying condition (D) shown in FIG. 10 will be described with reference to FIG. 18. At step #9-D01 the decision is made as to whether condition (D) has been set up, and if not, there is a jump to decisional step #9-D08. If condition (D) is set up, the main timer is set at step #9-D02, and the execution flag is reset at step #9-D03. At step #9-D04, the sub-eraser light is turned on, and the preliminary lighting is turned off at step #9-D05. Subsequently, the scanning solonoid is turned off at step #9-D06 and the full scale lighting for the copying operation is turned off at step #9-D07. At step #9-D08, if the sub-timer has been terminated, the program proceeds to condition (E) at step #9-D09. If not, the routine is terminated.

Under the condition (E), the high voltage is turned off (the step #9-E04). Inhibition to accept the function switch 40 is also released (the step #9-E07). The acceptance of the function switch 40 has been inhibited to avoid any possible erroneous operation.

Figure 20:
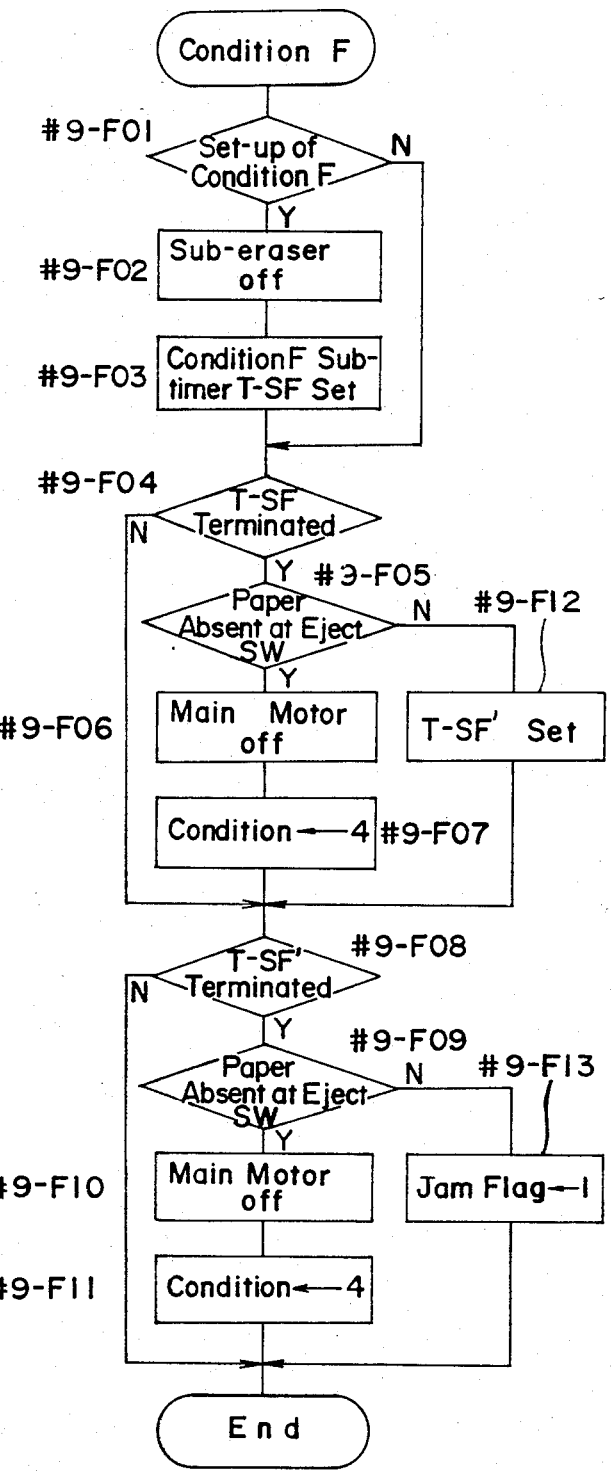

The condition (F) shown in FIG. 10 will be described with reference to FIG. 20.

The condition (F) is a condition in which a timer for the auto-shut is operated and in which only the main motor is turned on. When the sub-timer T-SF terminates (the step #9-F04 Y), whether or not the copying paper is present at the ejection detecting switch 50 is checked at the step #9-F05 and, if it is not present (the step #9-F05 Y), the main motor is turned off at the step #9-F06 and the condition is returned to (4) at the step #4-F07 thereby establishing the stand-by condition.

On the other hand, if the copying paper is present at the ejection detecting switch 50 (the step #9-F05 N), and if it is the first time, the sub-timer T-SF' is further set and the stand-by condition continues without the main motor being turned off until the copying paper is completely ejected. If the copying paper remains even when T-SF' has terminated (the step #9-F09 N), the copying paper will be determined as not ejected and the occurrence of the paper jam is judged at the step #9-F13.

Figure 21:
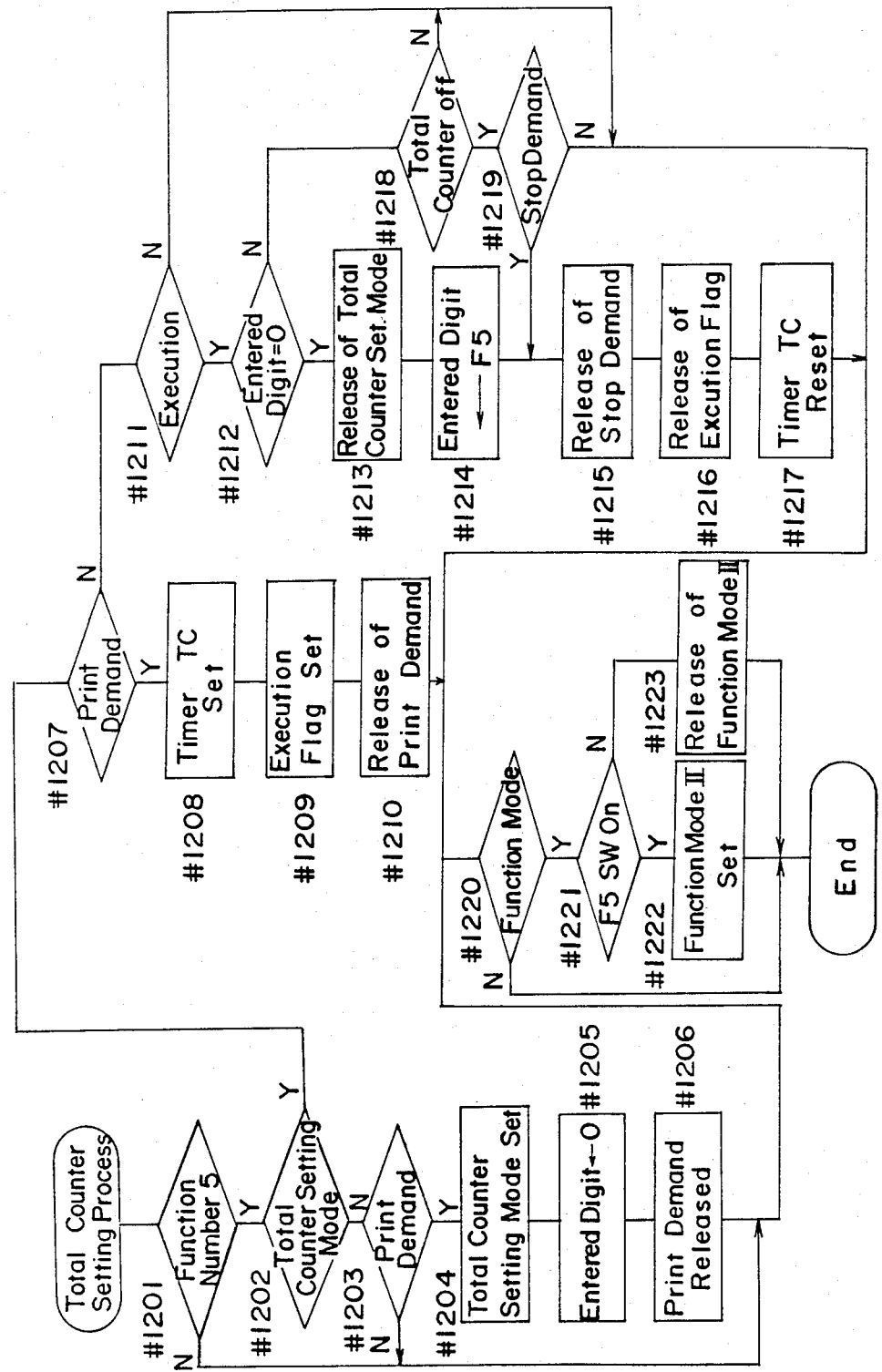
FIG. 21 is a flow chart showing the details of the control during the total counter setting process at the step #12 shown in FIG. 6.

The total counter setting process (the step #12) will now be described with reference to FIG. 21.

If the function under execution is "5" (the step #1201 Y), which is made at the step #1202 as to whether or not it is in the total counter setting mode. (Even if the display is merely F5 , the total counter setting mode will not be set.)

When the print demand is made (the step #1203) because of the print key 34 having been depressed while not in the total counter setting mode (the step #1202 N), the machine is set in the total counter setting mode (the step #1204) with the entered digits cleared (the step #1205) and, consequently, 00 is displayed to permit the print demand to be accepted, the print demand so accepted being released at the step #1206.

By reason of the setting in the total counter setting mode, two digits can be entered through the keyboard input arrangement (See the step #4.). A multiple copying operation in response to the setting of the total counter would be a function mode of operation as contrasted with a normal mode of operation wherein only a single copy is produced with set conditions.

When the print demand is further made (the step #1207 Y) during the total counter setting mode (the step #1202 Y), a timer TC for driving the total counter is set at the step #1208 and the total counter 51 undergoes its counting operation during the jam detection and total counter processing (the step #17). Simultaneously therewith, the execution flag is set (the step #1209) to indicate the execution and the print demand is released (the step #1210).

If it is during the counting operation of the total counter (the step #1210), check is made as to whether or not the entered digit becomes zero (the step #1212). When the entered digit becomes zero and the counting operation completes (the step #1212 Y), the settting mode is released (the step #1213) and, since the entered digit returns to the display of F5 at the step #1214, re-execution is possible. Incident to the termination, the stop demand execution flag is released (the steps #1215 and #1216) and, at the same time, the counting timer T-TC is reset at the step #1217.

If it is during the continuance of the counting operation (the step #1212 N), the stop demand is accepted only during the period in which the solenoid of the total counter 51 is deenergized (the step #1218 Y), and simultaneously with the termination the stop demand execution flag is released (the steps #1215 and #1216) and, consequently, the timer T-TC is reset (the step #1217) to inhibit the counting operation, but the setting mode is not released and accordingly, the display displays the count value obtained at that time while the continued counting operation is possible by depressing the print key 34.

During the following process, the selection of the function mode can be carried out.

If it is found to be in the function mode at the step #1210, the step #1221 follows to determine the "F5" switch 56. The "F5" switch 56 is a switch capable of performing the function "5" (the total counter setting) and, if this switch is turned off, the key input is accepted only from "1" to "4". However, when the switch 56 is turned on, the function mode "II" is set at the step #1222 with "1" to "5" being acceptable.

Figure 22:
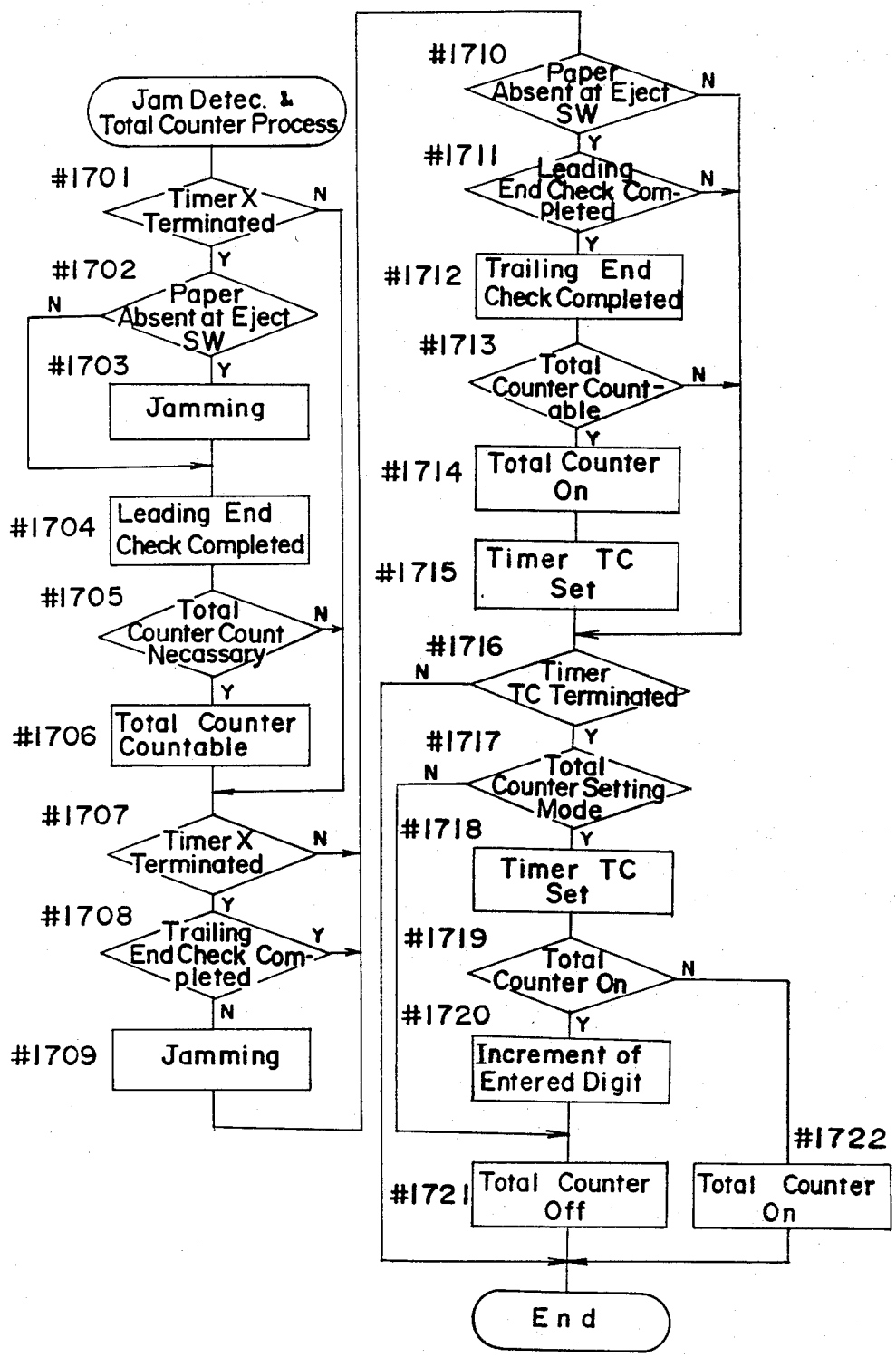
FIG. 22 is a flow chart showing the details of the control during the jam detection and total counter processing at the step #17 shown in FIG. 6.

The jam detection and total counter processing (the step #17) will be described with reference to FIG. 22.

When the leading end jam detecting timer T-X terminates (the step #1701 Y), check a is made at the step #1702 as to whether or not the copying paper is present at the eject switch 50. If no copying paper is present, it is determined at the step #1703 that the jamming has occurred. This occurrence of the jamming is detected during the trouble shooting (the step #22) and trouble resolving is carried out. When the leading end check is done at the step #1704, check is made at the step #1705 as to whether or not the total counter 51 should perform its counting operation. Under the function mode, the total counter 51 does not perform its counting operation.

Upon termination of the trailing end detection timer T-Y (the step #1707 Y), it is determined at the step #1708 whether or not the checking of the trailing end of the copying paper 22 has completed. If it is found that the checking has not yet completed, it is deemed that the copying paper has not yet moved past the ejection detecting switch 50 indicating the occurrence of the paper jam.

In the event that the copying paper is not present at the ejection detecting switch 50 (the step #1710 Y) and the checking of the leading end of the copying paper has completed (the step #1711 Y), it is deemed that the copying paper has moved therepast and the checking of the trailing end has completed. Should the total counter be ready to count at the time the copying paper has moved past the ejection detecting switch 50 (the step #1713 Y), the total counter 51 is turned on at the step #1714 and, subsequently, an on-time timer T-TC is set at the step #1715.

Upon termination of the timer T-TC (the step #1716 Y), the drive of the total counter 51 is interrupted if it is not in the total counter setting mode (the steps #1717→#1721), and the next succeeding count will not be initiated with the counter having performed only one count (normal counting operation).

On the other hand, if it is in the total counter setting mode (the step #1717 Y), the timer T-TC is again set at the step #1718 upon termination of the timer T-TC. In the event that the total counter is turned off (the step #1719 N) at the time the timer T-TC has terminated (the step #1716 Y), it is turned on but it is turned off at the step #1722 upon termination of the timer T-TC. Simultaneously with the switching-off, the increment is effected to the entered digit of the total counter 51 with the current count value being displayed as the number of the copying papers.

(In this example, the same timer T-TC is used for both of the on-time and the off-time of the total counter 51.)

Figure 23:
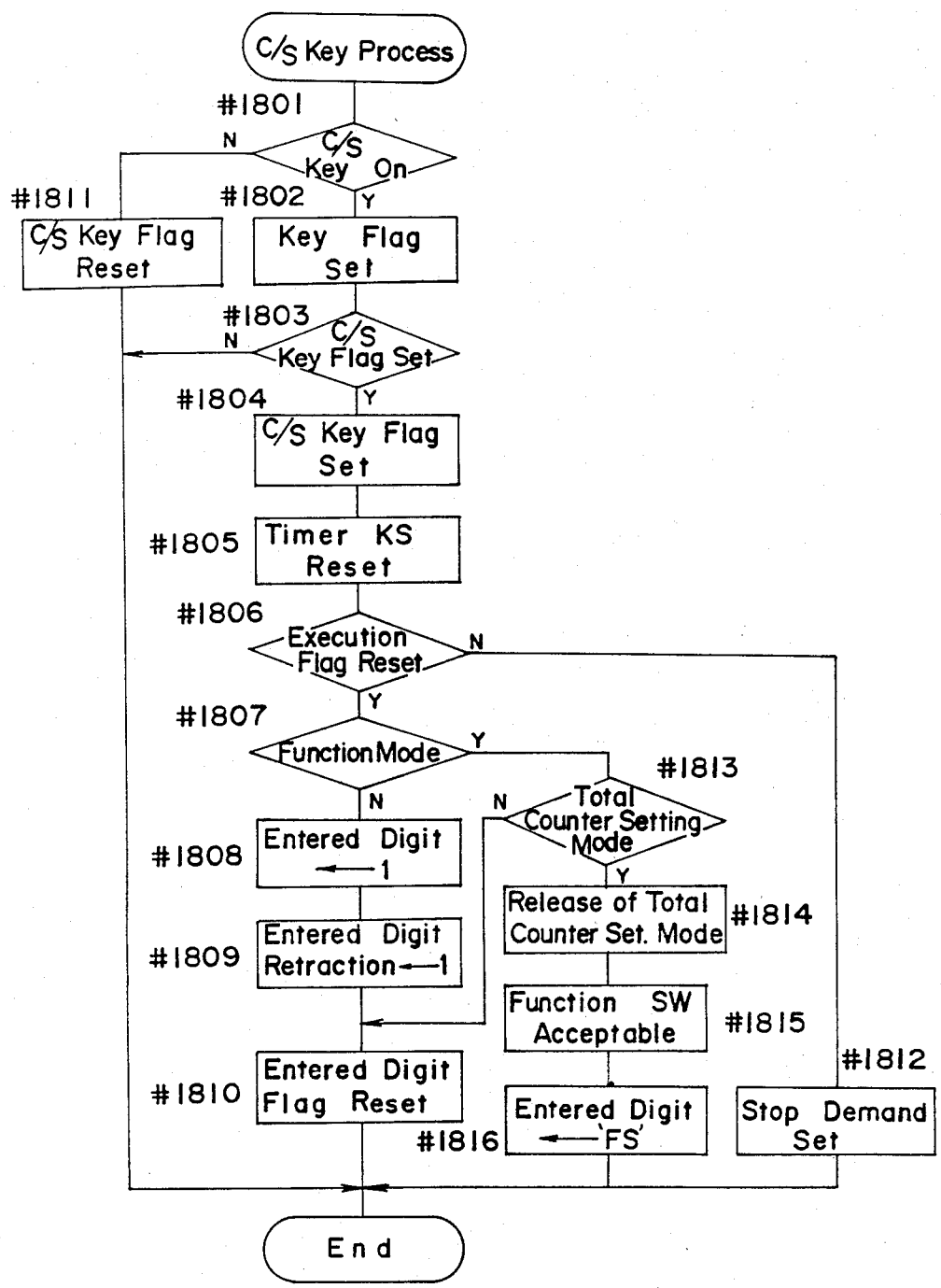
FIG. 23 is a flow chart showing the details of the control during the C/S key processing at the step #18 shown in FIG. 6.

The C/S key processing (the step #18) will now be described with reference to FIG. 23.

When the C/S key 35 is turned on at the step #1801, the key flag is set at the step #1801 so that the other keys (the digit keys 31 and 32, the function switch 40 and the print key 34) cannot be accepted. At the set-up of the C/S key 35 (the step #1803 Y), the timer T-KS for the entered digits is reset at the step #1805, thereby avoiding the increment of the next succeeding digit to be entered. During the copying operation or the execution of the function (the counting operation when in the total counter setting mode) (the step #1806 N), the stop demand is set at the step #1812 and this stop demand is determined during the stop processing at the step #20 (In the case during the total counter setting mode, the total counter setting). If it is not during the execution (the step #1807 N), both the entered digit and the entered digit saving memory are rendered 1 (the steps #1808 and #1809) and the entered digit flag is reset (the step #1810).

Under the total counter setting mode (the condition in which the two digits can be entered) (the steps #1807 Y and #1813 Y), the total counter setting mode is released at the step #1814 so as to subsequently render the function switch 40 to be acceptable at the step #1815 with the consequence that [F̄5] being displayed.

When it is during the function mode (the step #1807 Y), but not during the total counter setting mode (the step #1818 N), the step #1810 takes place to reset the entered digit flag with the consequence that [F̄] being displayed.

The stop processing (the step #20) will now be described with reference to FIG. 24.

When the stop demand arises (the step 2001 Y) and if it is in the normal mode (the step #2002 N), whether or not it is acceptable is determined at the step #2003. It cannot be accepted during the scanning operation. In addition, unless the current condition is the condition (C) (from the time of completion of the scanning operation to the time of switching-on of the paper feed switch) (the step #2004 N), the condition is transferred to (D) at the step #2005 to carry out the post-processes. If it is in the condition (D) (the step #2004 Y), the resetting of the execution flag at the step #2006 terminates the condition (C) to initiate the condition (D) so that the post-processes can be performed. When the stop demand is accepted, the stop demand is released at the step #2007.

The printing process (the step #21) will be described with reference to FIG. 25.

Although the print demand is set when the print key is depressed and then accepted, once the print demand arises (the step #2101 Y), is is temporarily released at the step #2102 so that checking from the step #2102 to the step #2107 can be performed, and at the step #2109, the execution flag is set to indicate that the printing process is in execution. If it is not in the function mode, but in the normal mode (the step #2103 N), whether or not a wait of a heater has completed (the step #2104) and whether or not the paper supply unit is empty (the step #2105) are minimum necessary requirements for the acceptance of the print demand.

If the conditions are ready by this time, check is made as to whether or not the condition is (C) (from the termination of the scanning operation to the switching-on of the paper feed control switch 46) (the step #2107). If it is in the condition (C), the preliminary processes are unnecessary and the operation takes place in a manner similar to the operation during the multi-copying and, therefore, the determination of this condition is accepted. If not in the condition (C), the step #2108 is initiated to transfer the condition to (5) thereby initiating the preliminary processes.

If in the condition (C), the step #2109 is initiated to set the execution flag and, therefore, at the time of termination of the condition (C), the execution flag can be checked (the step #9-C18). If it is during the execution, the copying operation is continued at the step #9-C19.

The execution flag is set at the step #2109 and, at the same time, the demand is released at the step #2110 since there may be the possibility that the stop demand is being set.

When the print demand arises during the function mode, the function operation, except for the function number "5", corresponding thereto can be initiated and, therefore, the further details thereof will not be described herein.

Figure 26:
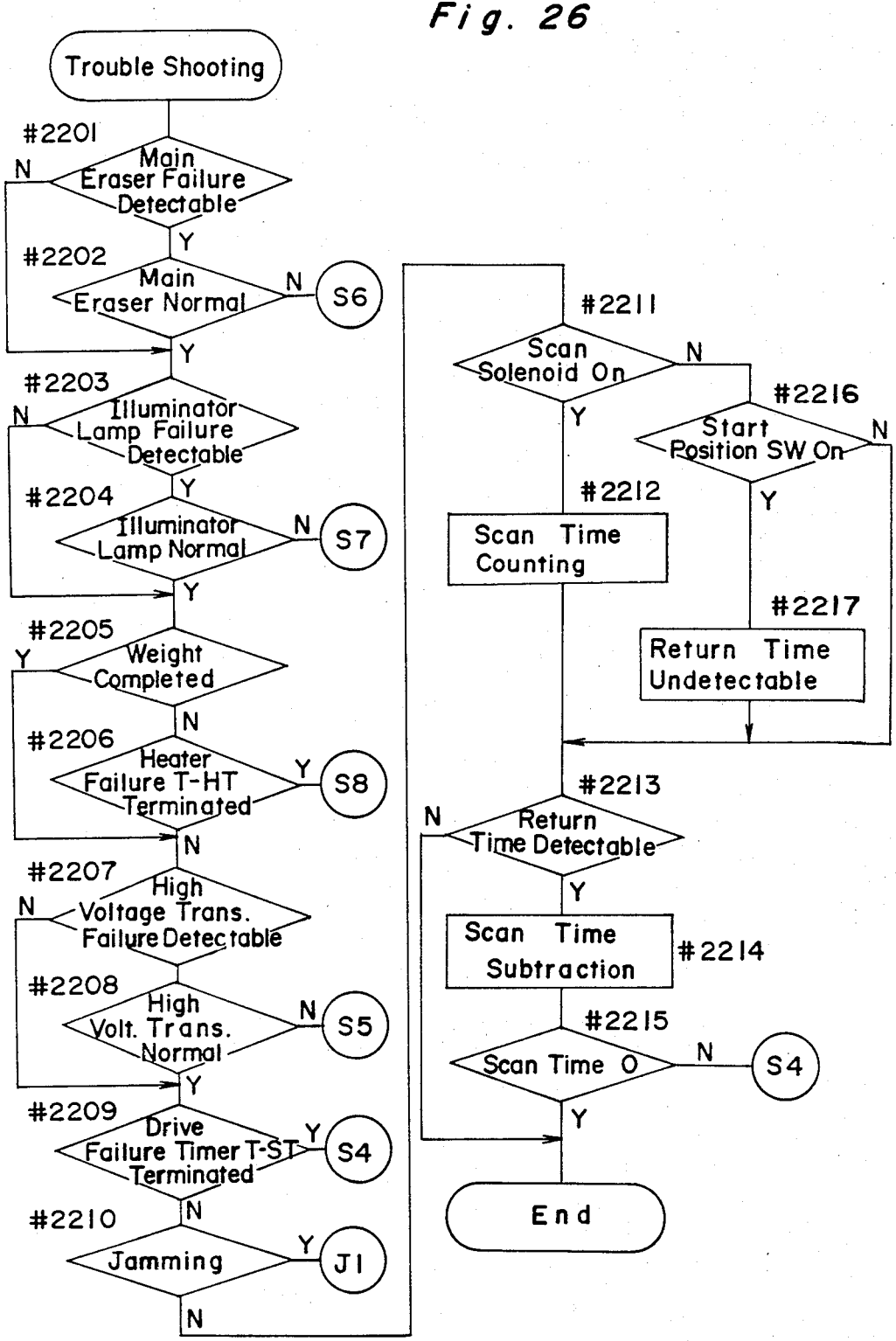
FIG. 26 is a flow chart showing the details of the control during the trouble shooting at the step #22 shown in FIG. 6.

The trouble shooting (the step #22) will now be described with reference to FIG. 26.

In the event that the main eraser 20 is in an abnormal condition (the step #2202 N) with CdS not receiving light) at the time of failure of the main eraser can be detected (the step #2201 Y), the trouble routine is initiated from a terminal S6.

Similarly, when the illuminator lamp is in an abnormal condition (the step #2204 N) and when the high voltage transformer is in an adnormal condition (the step #2208 N), the steps proceed respectively to S7 and S5.

If the wait condition is not completed and the heater failure timer (to be set at the time of initialization) terminates (the step #2206 Y) or if a drive failure timer T-ST terminates (the step #2209 Y), the steps proceed respectively to S8 and S4.

If the paper jam occurs during the jam detection and total counter processing (the step #17) or during the copying operation (the step #9) (the condition (F)), the step #2210 of this trouble shooting proceeds to J1.

When the scan solenoid is turned on (the step #2211 Y), the scanning time can be counted at the step #2212 and the count is used for the detection of a failure during the return of the transparent support 11 at the step #2212.

When the start position detecting switch 43 is turned on (the step #2216 Y) while not in the scanning operation (the step #2211 N), the detection of the drive failure during the return movement is inhibited. (The return failure detection during the multi-copying operation is not affected directly since the subsequent drive failure time can be set upon return to the start position.) Simultaneously therewith, the detection of the return time is terminated.

Upon completion of the scanning (the step #9-C01 Y→#9-C05) (including the paper empty and a miss-feed at the start of the copying paper supply), the return time can be detected (the step #9-C06) and the scan time counted during the period in which the scan solenoid is turned on (the steps #2211 Y and #2212) can be subtracted (the step #2213 Y and #2214). If the result of subtraction becomes zero, the drive failure is determined in view of the return speed being higher than the scan speed and the step then proceeds to the trouble routine S4.

Although in this example the scan time used is in the form as it is, it may be adjusted, for example, multiplied by a coefficient, to a proper value.

Figure 27:
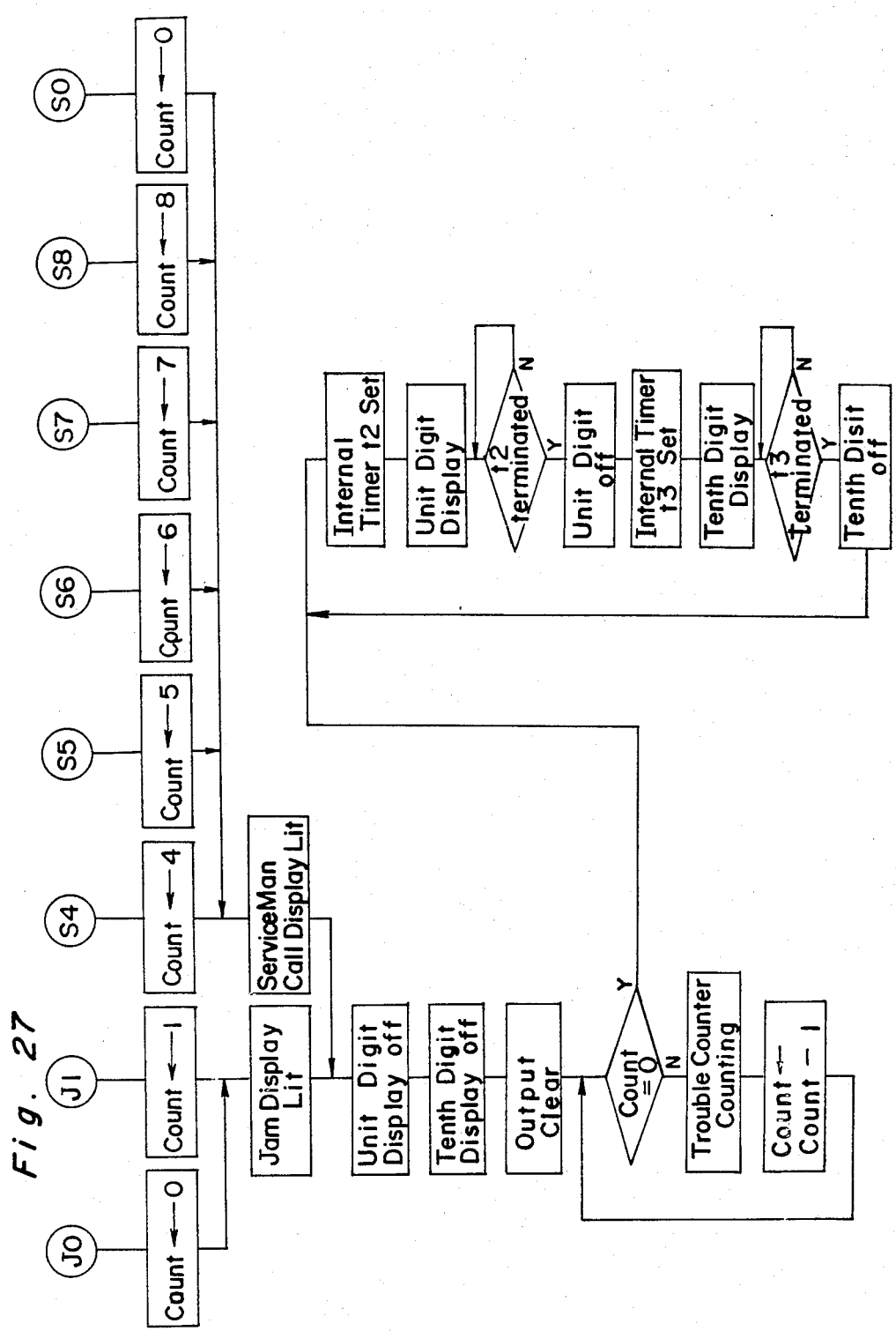
FIG. 27 is a flow chart showing the details of the control of the trouble routine.

The trouble routine will now be described with reference to FIG. 27.

In the case where a trouble such as the jam or the condition requiring a call of the servicing man occurs, a count corresponding to the particular trouble is displayed in a trouble counter and no switches are accepted thereafter.

Terminals J0 and S0 represent trouble counters at the time of the supply of the electrical power and, unless the trouble counters are reset at the time of the detection of the resetting, it will not proceed thereto and no copying operation is performed.

S1 represents the jam, S4 represent the drive failure, S5 represents the charger failure, S6 represents the eraser failure, S7 represents the illuminator lamp failure, and S8 represents the heater failure.

The jam display and the call servicing man display are respectively lit when the jam has occurred and when the call of the servicing man becomes required. The copy number display is turned off with the output cleared and also with the load turned off. Thereafter, a signal corresponding to the respective troubles are outputed to the trouble counters. When the counting performed by the trouble counters terminates in response to these signals, the copy number display is effected with no input from any key and switch being accepted.

The operation necessary to check the occurrence of an abnormal condition during the return of the transparent support in the copying machine of the type described hereinbefore will now be summarized as follows.

Figure 10B:
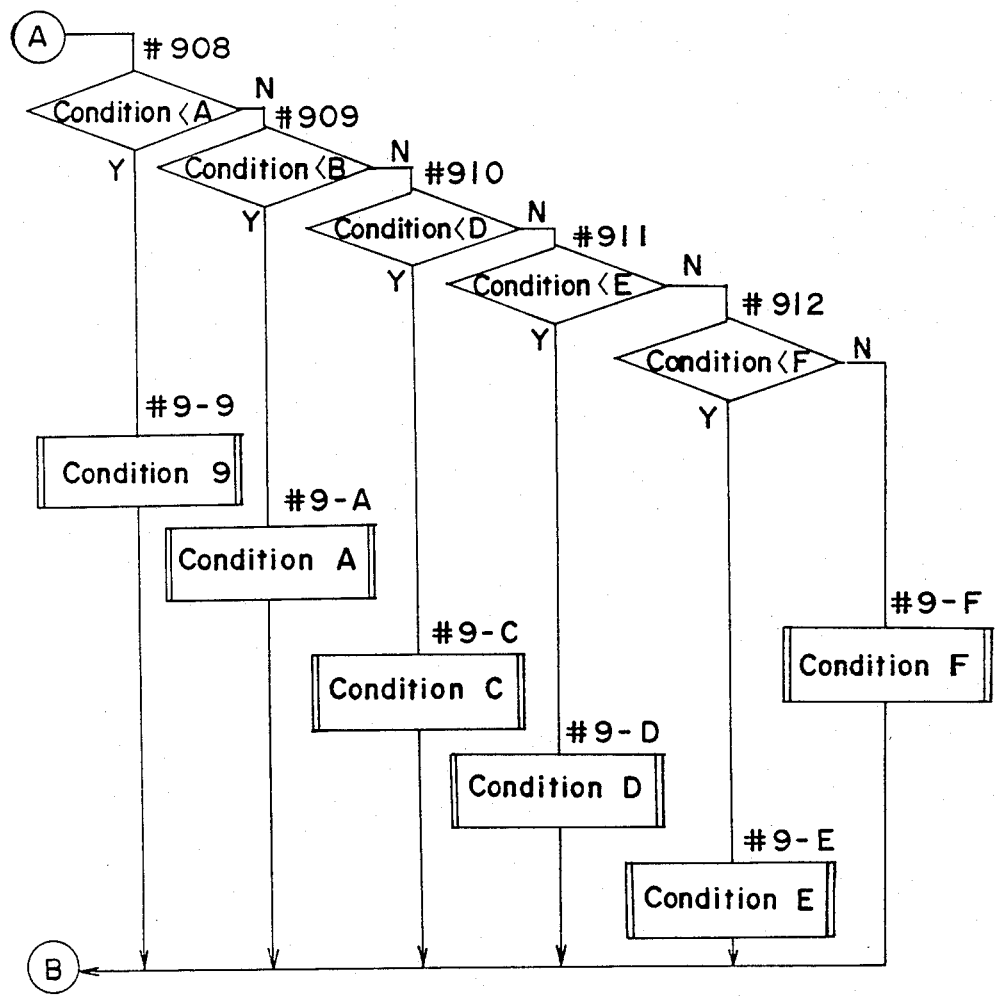
FIG. 10 is a flow chart showing the details of the control during the copying operation at the step #9 shown in FIG. 6.
Figure 15A:
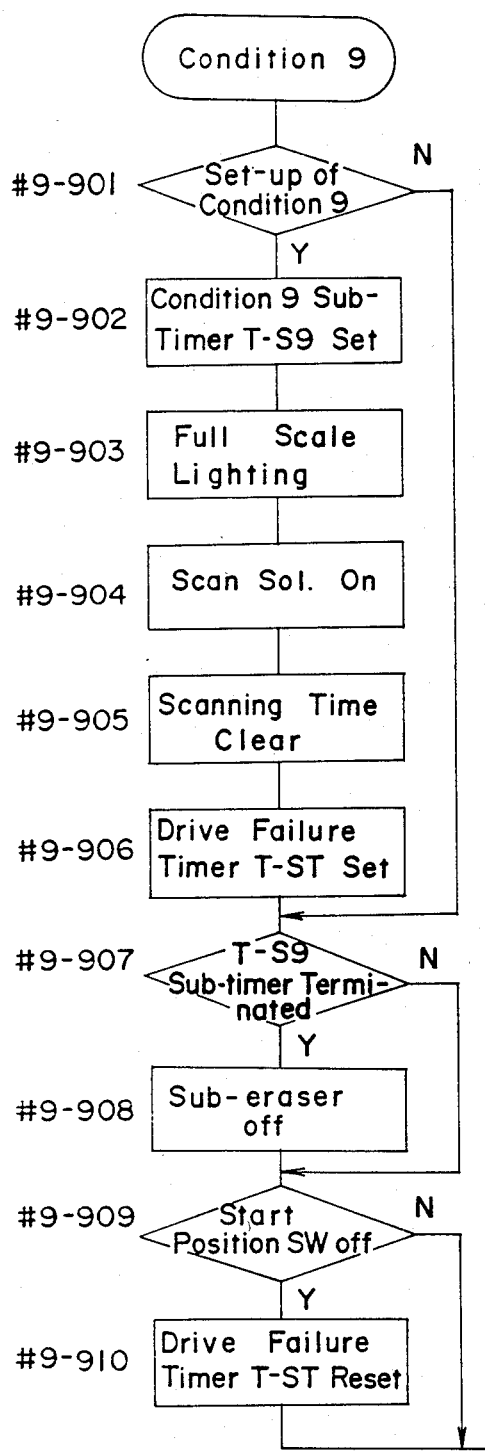
Figure 15:
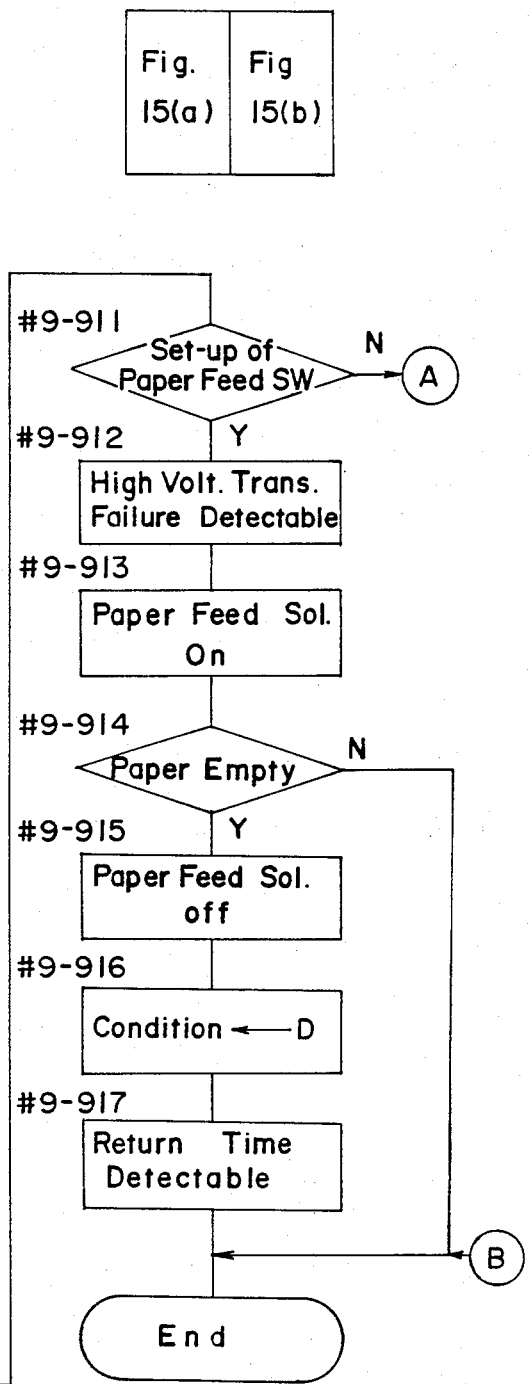
Figure 15B:
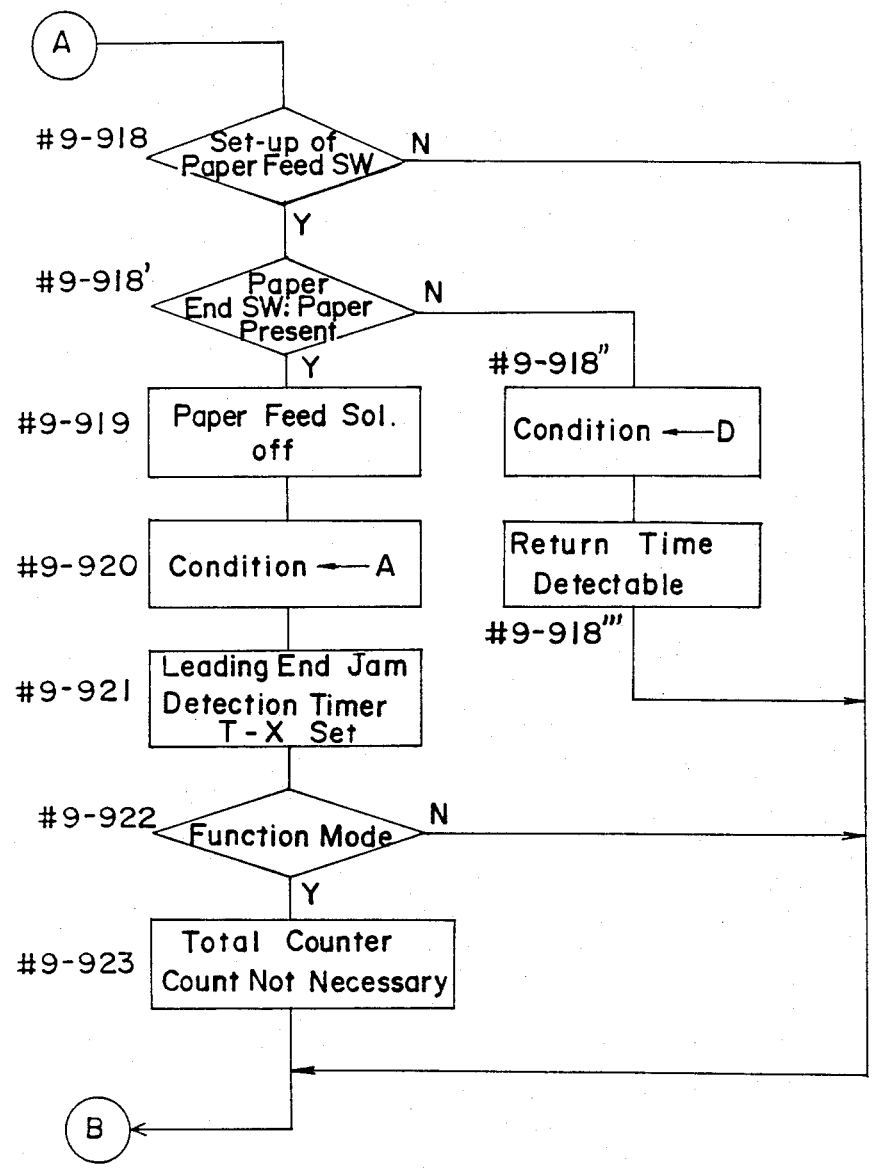

During the condition (9) of the step #9 shown in FIGS. 10 and 15, when the transparent support 11 starts its scanning movement (the step #9-904) the timer for counting the scan time is cleared (the step #9-905). Then, as shown by the steps #2211 and #2217 in FIG. 26, the scan time is counted while the scan solenoid is turned on and the count value is subtracted until the scan solenoid is turned off followed by the switching on of the start position switch. The detection of the occurrence of the abnormal condition is carried out in consideration of both the timing at which the result of the subtraction becomes "0" and the timing at which, upon return of the transparent support to the start position, the process to make the return time undetectable is initiated, and since the return speed is higher than the scanning speed, the abnormal condition is deemed as occurring when the result of the subtraction becomes "0" thereby proceeding to S4 to effect the display of the abnormal condition.

As hereinbefore fully described, the present invention is such that, while a scan moving means for the transparent support and the like moves in a scanning direction, the time thereof is counted and stored, the count value being utilized to detect the occurrence of the abnormal condition during the return of the transparent support. Therefore, even in a copying machine of random return type, an accurate and quick detection of the occurrence of the abnormal condition in the scanning system can be achieved.

Although the present invention has fully been described in connection with the preferred embodiment thereof with reference to the accompanying drawings, it is to be noted that various changes and modifications are apparent to those skilled in the art. Such changes and modifications are, unless they depart from the true scope of the present invention, to be understood as included therein.

I claim:

1. An abnormality detecting device for a copying machine including a scanning means supported for reciprocal movement, for scanning an original to be copied, which device comprises:
    a timer means capable of performing a time counting operation incident to the scanning movement of the scanning means and terminating the time counting operation upon completion of the scanning movement to produce count data;
    means for storing the count data of the scanning movement and providing count data of the return movement;
    means for determining whether or not a return movement of the scanning means is taking place, by subtracting the return count data from the data corresponding to the scanning time, during the return time period of the scanning means, to a predetermined value and to then determine whether the return movement has been normal or abnormal in reference to the predetermined value and the time at which the scanning means returns to the predetermined position.

2. A device as claimed in claim 1, wherein the speed of the return movement of the scanning means is higher than the speed of the scanning movement of the scanning means, and wherein, when the predetermined value becomes zero, the determining means determines the occurrence of an abnormal condition.

3. An abnormality detecting device for a copying machine including a scanning means supported for reciprocal movement for scanning an original to be copied, which device comprises, in combination:
    a switching means adapted to be activated incident to the reciprocal movement of the scanning means;
    a timer means capable of starting its counting operation incident to the scanning movement of the scanning means;

means for subtracting the count value, counted by the timer means, incident to the return movement of the scanning means; and means for determining a normal condition in the event that said switching means is activated by the scanning means before the result of the subtraction becomes a predetermined value and an abnormal condition in the event that the result of the subtraction becomes the predetermined value before the switching means is activated by the scanning means.

4. A device as claimed in claim 3, wherein the speed of the return movement of the scanning means is higher than the speed of the scanning movement of the scanning means and wherein the predetermined value is zero.

5. An abnormality detecting device for a copying machine including a scanning means supported for reciprocal movement for scanning an original to be copied, which device comprises, in combination:

a home position detecting switch for detecting that the scanning means is held at a predetermined stop position;

means for initiating the supply of a copying paper incident to the scanning movement of the scanning means;

means for generating a return signal necessary to interrupt the scanning movement of the scanning means according to the size of the copying paper used and to cause the scanning means to undergo a return movement;

a timer means capable of starting its counting operation incident to the scanning movement of the scanning means;

means responsive to the return signal for subtracting the count value of the timer means; and means for determining a normal condition in the event that, before the result of the subtraction becomes zero, the detecting switch is turned on and an abnormal condition in the event that, before the detecting switch is turned on, the result of the subtraction becomes zero.

6. A device as claimed in claim 5, further comprising means for detecting whether or not the copying paper is supplied normally and wherein the return signal is also generated even when an abnormal condition occurs in the supply of the copying paper.

7. A device as claimed in claim 5, further comprising an empty detecting means for detecting whether or not the copying paper is accommodated at a predetermined stock section at the time of initiation of the supply of the copying paper, and wherein the return signal is also generated even when an empty condition is detected by said empty detecting means.

8. An abnormality detecting device for a copying machine including a scanning means supported for reciprocal movement for scanning an original to be copied, which device comprises, in combination:

means for generating signals of a predetermined duration;

a counter capable of starting its counting operation for counting the signals incident to a scanning movement of the scanning means and terminating the counting operation upon completion of the scanning movement;

counting means, capable of starting its counting operation for counting the signals incident to the return movement of the scanning means; and means for determining whether or not the return movement of the scanning means takes place in a predetermined normal mode of operation, in reference to the count value and the time required for the scanning means, to move back to a predetermined position.

9. A device as claimed in claim 8, wherein said determining means is operable to subtract, each time said signals are generated, from the count value counted during the scanning movement, the value counted by the counting means during the return movement of the scanning means and to determine whether the return movement has been normal or abnormal, in reference to the relationship between the result of the subtraction and the timing at which the scanning means returns to the predetermined position.

10. A device as claimed in claim 9, wherein the speed of the return movement of the scanning means is higher than the speed of the scanning movement of the scanning means and wherein said determining means determines a normal condition in the event that, before the result of the subtraction becomes zero, the scanning means returns to the predetermined position and an abnormal condition in the event that, before the scanning means returns to the predetermined position, the result of the subtraction becomes zero.

* * * * *